United States Patent
Krasnow et al.

(10) Patent No.: US 10,072,339 B2
(45) Date of Patent: Sep. 11, 2018

(54) COMPOSITIONS FOR USE IN CORROSION PROTECTION

(71) Applicant: Agienic, Inc., Tucson, AZ (US)

(72) Inventors: Nicholas Krasnow, Tucson, AZ (US); Anoop Agrawal, Tucson, AZ (US); Donald R. Uhlmann, Tucson, AZ (US)

(73) Assignee: Agienic, Inc., Tucson, AZ (US)

(*) Notice: Subject to any disclaimer, the term of this patent is extended or adjusted under 35 U.S.C. 154(b) by 0 days.

(21) Appl. No.: 15/453,670

(22) Filed: Mar. 8, 2017

(65) Prior Publication Data

US 2017/0175275 A1    Jun. 22, 2017

Related U.S. Application Data

(63) Continuation of application No. 14/701,001, filed on Apr. 30, 2015, now abandoned, and a continuation-in-part of application No. 14/843,556, filed on Sep. 2, 2015, now Pat. No. 10,034,478, which is a continuation of application No. 14/089,146, filed on Nov. 25, 2013, now Pat. No. 9,155,310.

(60) Provisional application No. 61/987,477, filed on May 1, 2014, provisional application No. 62/035,388, filed on Aug. 9, 2014, provisional application No. 61/881,318, filed on Sep. 23, 2013.

(51) Int. Cl.
| | | |
|---|---|---|
| C09K 3/00 | (2006.01) |
| C08K 5/07 | (2006.01) |
| C09K 8/54 | (2006.01) |
| C09D 5/08 | (2006.01) |
| C08K 9/04 | (2006.01) |
| C23F 11/04 | (2006.01) |
| C08K 3/16 | (2006.01) |

(52) U.S. Cl.
CPC ............. *C23F 11/04* (2013.01); *C08K 3/16* (2013.01); *C09K 8/54* (2013.01)

(58) Field of Classification Search
None
See application file for complete search history.

(56) References Cited

U.S. PATENT DOCUMENTS 3,141,780 A * 7/1964 Simon ................. C23C 18/38
                                                  106/1.13
3,514,410 A * 5/1970 Engle .................. C23G 1/04
                                                  134/41

(Continued)

FOREIGN PATENT DOCUMENTS

WO    WO2013092440    6/2013

*Primary Examiner* — Joseph D Anthony
(74) *Attorney, Agent, or Firm* — Rothwell, Figg, Ernst & Manbeck, P.C.

(57) ABSTRACT

The invention relates to compositions, methods and preparation of such compositions to protect metals from corrosion, especially acid corrosion. The compositions of this invention may be added to acids to protect metals from their corrosive influence, particularly at elevated temperatures. These compositions are of particular utility in the oil and gas (petroleum) industry. Also disclosed are "corrosion inhibition intensifiers" to enhance the corrosion inhibition properties of other corrosion inhibitors. Formulations which control ferric ions in acidic solutions are also disclosed. These may be combined with inhibited acids and some compositions provide both corrosion inhibition and ferric ion control.

14 Claims, 2 Drawing Sheets

Left, 300 ppm Cu as bulk CuI. Right, 300 ppm Cu as F1 (surface functionalized CuI particles)

(56) References Cited

U.S. PATENT DOCUMENTS

| | | | | |
|---|---|---|---|---|
| 3,773,465 | A | * 11/1973 | Keeney | C09K 8/54 134/3 |
| 5,697,443 | A | * 12/1997 | Brezinski | C09K 8/54 166/307 |
| 8,003,581 | B1 | * 8/2011 | Vinson | C09K 8/60 166/304 |
| 8,563,020 | B2 | 10/2013 | Uhlmann et al. | |
| 9,155,310 | B2 | 10/2015 | Uhlmann et al. | |
| 9,161,544 | B2 | 10/2015 | Uhlmann et al. | |
| 2009/0156432 | A1 | * 6/2009 | Cassidy | C09K 8/54 507/205 |
| 2011/0100630 | A1 | * 5/2011 | Evans | C09K 8/74 166/305.1 |
| 2012/0301528 | A1 | * 11/2012 | Uhlmann | A01N 59/16 424/405 |
| 2013/0315972 | A1 | * 11/2013 | Krasnow | A01N 25/12 424/409 |
| 2014/0271757 | A1 | * 9/2014 | Agrawal | C09K 8/524 424/405 |
| 2014/0318403 | A1 | * 10/2014 | Amick | F42B 7/046 102/459 |
| 2015/0373989 | A1 | 12/2015 | Krasnow et al. | |
| 2015/0376379 | A1 | 12/2015 | Krasnow et al. | |
| 2016/0032180 | A1 | 2/2016 | Agrawal et al. | |
| 2016/0135470 | A1 | 5/2016 | Agrawal et al. | |
| 2016/0220728 | A1 | 8/2016 | Adams et al. | |

* cited by examiner

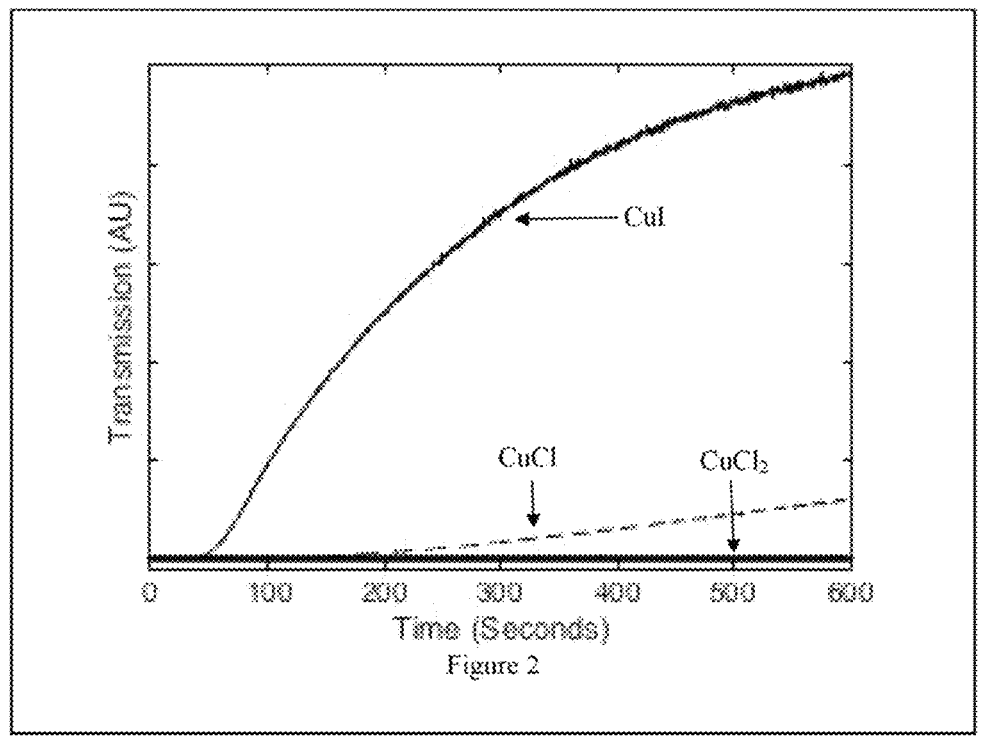

COMPOSITIONS FOR USE IN CORROSION PROTECTION

CROSS REFERENCE TO RELATED APPLICATIONS

This application is a continuation of U.S. patent application Ser. No. 14/701,001, filed on Apr. 30, 2015, now abandoned, which claims priority to the U.S. provisional application Ser. No. 61/987,477, filed on May 1, 2014, and also U.S. provisional application Ser. No. 62/035,388, filed on Aug. 9, 2014. This application is a continuation-in-part of U.S. patent application Ser. No. 14/843,556, filed on Sep. 2, 2015, which is a continuation of U.S. patent application Ser. No. 14/089,146, filed on Nov. 25, 2013, now patented as U.S. Pat. No. 9,155,310, issued on Oct. 13, 2015, which claims priority to U.S. provisional application Ser. No. 61/881,318, filed on Sep. 23, 2013. The contents of all of the foregoing applications are incorporated herein by reference in their entirety.

FIELD OF THE INVENTION

The invention relates to corrosion inhibitor compositions, methods and preparation of these compositions to protect metals from corrosion, especially acid corrosion. This is of particular interest in the oil and gas (petroleum) industry, but also has application in other industries. The compositions of this invention may be added to acids to protect metals from the corrosive influence of these acids. These may also be used as "corrosion inhibition intensifiers" to enhance the corrosion inhibition properties of other corrosion inhibitors. Collectively corrosion inhibition and corrosion inhibition intensification will be called "corrosion inhibition" unless called out separately.

BACKGROUND OF THE INVENTION

Corrosion of metals in contact with acids is caused by reaction between them. In many industrial processes and equipment (e.g., piping, tanks, valves, cooling towers, heat exchangers, etc), acids (or aqueous acidic solutions, collectively called "acids") are used for periodic cleaning of metallic components (e.g., removing of deposited scale); and such exposure to acids causes enhanced corrosion of the metals. Sometimes corrosion inhibitors are also added to water to reduce corrosion caused by its reaction with metals. In oil wells, one may use strong acids for cleaning well bores, particularly for newly installed wells and also for periodic stimulation of existing wells to restore production rates of oil and gas. Acidization or acid treatments of oil and gas wells is also done as part of fracking process, where typically the acidization treatment is followed by injecting large volume of water and sand particles with other components under pressure. This stimulation is done to dissolve debris-blocking porosity and cracks in rock formations which block the flow of oil or gas. Since the addition of these acids in the wells is done through metallic (mainly ferrous) pipes, the acids can corrode them. In the petroleum industry, corrosion problems (reaction between acid and metals) intensify with depth of the wells, as the temperature increases with depth. In some cases, acids can come in contact metals at temperatures as high as 230° C. under high pressure and rapid flow conditions. Although the protection of ferrous materials is an important focus; the present invention may also be used in protecting other metals and alloys from corrosion, especially acid corrosion.

The corrosion inhibition being addressed here is different from the corrosion caused or increased by microbes (such as sulfate reducing anaerobic bacteria), where for example iron may be converted to soft iron sulfide. Such corrosion protection is achieved by killing the bacteria and or protecting metals from the gases released by such bacteria. In this invention the main issue being addressed is acid caused corrosion rather than microbially-induced corrosion (MIC). The purpose of the present invention is to reduce corrosion by preventing reaction between acids and metals by incorporating additives of the present invention in the acidic fluids.

The extent of corrosion is typically expressed in terms of the weight loss/area (as kilograms of reduction in metal weight due to corrosion for each square meter of exposed area or pounds/sq ft, etc.) in a specified period of time. In some cases corrosion is also expressed in terms of reduction in the number of corrosion pits (when pitting corrosion takes place). When corrosion is measured on samples of identical geometry then it may also be expressed as % weight loss for relative comparison. The focus of this disclosure is on additives for aqueous acidic solutions so that corrosion of a metallic component is decreased when they are put in contact with acids. Typically higher concentrations of the corrosion protection agent will be required to achieve a desired level of corrosion inhibition with increasing acid strength and temperature. In some cases, the corrosion inhibitors of this invention may also be added to other petroleum well completion and production fluids.

Important processing steps in the petroleum industry where acids are typically added include:
1. Drilling, completion and workover fluids.
2. Cleaning of well bores (e.g., newly cemented wells)
3. Hydraulic fracturing (fracking) process.
4. Flooding and injecting of water during production of oil and gas.
5. Pipelines, tank flush, pipeline pigging and scraping and packer fluids (maintenance).
6. Well stimulation Among these processing operations, strong acids are commonly used for cleaning well bores, fracking and well stimulation. The strong acids dissolve cement residues from well bores and in fracking and stimulation they dissolve constituents of underground formations to increase the porosity of these formations in order to enhance oil flow and recovery.

Some of the ferrous materials used in the petroleum industry for which corrosion protection is desired are chrome steels, low carbon steels, duplex steels, stainless steels, martensitic alloy steels, ferritic alloy steels, austenitic stainless steels, precipitation-hardened stainless steels, high nickel content steels, etc. Some of the specific alloys routinely used in the petroleum industry for tubing and piping applications include N-80, L-80, J-55 P-110, 13Cr (regular, modified and super-chrome), 22Cr, QT800, QT900 and QT 1000, etc. To protect the in-place tubes cemented to the well bores and to reduce the amount of acid needed, one lowers a flexible tubing (coiled in a spool, and called coil tubing) into the well bore close to the bottom so that acid can be delivered through this tubing. These coil tubings are typically made of low carbon steel and may corrode with repeated acid use. Such tubes also need protection from the acids to prolong their lives.

Some examples of typical acidic compositions used in the petroleum industry are:
1. Hydrochloric acid in a range of 5 to 34% strength by weight.

2. Acetic acid in a range of 1 to 15% strength by weight.
3. Formic acid in a range of 1 to 10% strength by weight.
4. Hydrofluoric acid in a range of 0.5 to 6% strength by weight.
5. Sulfamic acid formulations
6. Chloroacetic acid formulations
7. Mixtures of these and/or other acids The acids are selected based on well characteristics such as the tubular steel compositions and the geology of the rocks. The acids are mixed with corrosion inhibitors and other additives before they are injected into the wells. Some examples of these additives are iron control agents (e.g., citric acid, acetic acid), breaker materials (e.g., NaCl, $CaCl_2$), scale inhibitors (sodium polycarboxylate, phosphonic acid salt), surfactants (nonionic, cationic and anionic), reducing agents (sodium erythorbate, thio compounds) and viscosity modifiers. All of the additive components should be selected so that they are mutually compatible when added to the acids.

The corrosion inhibitors/intensifiers of this invention may be combined with additional corrosion inhibitors (including conventional corrosion inhibitors) or corrosion inhibition intensifiers (CIIs). One aspect of this innovation is the use of solid corrosion inhibitor or CII components which have low water solubility. A highly preferred method of adding such materials according to the present invention involves preparing surface functionalized particles which can easily be dispersed in aqueous media. Low water solubility materials are defined as those which at room temperature have a water solubility of less than 100 mg/liter and preferably less than 15 mg/liter of water. The surface functionalization is typically carried out using materials which have a molecular weight of at least 60 and preferably at least 80 and most preferably at least 100. More on surface functionalization and preparation of such particles is provided in published US patent application 2014/0271757 the disclosure of which is included herein by reference. Corrosion inhibitor formulations which combine several inhibitors synergistically is also an object of the present invention, as are corrosion inhibitors that reduce ferric ions to mitigate the corrosion caused by such ions and also to mitigate sludge formation caused by ferric ions.

SUMMARY OF THE INVENTION

The corrosion inhibitors or corrosion inhibition intensifiers of this invention may be added to acidic solutions in order to reduce the corrosion of metals (or the reactivity with metals) which come in contact with such acidic solutions. Typical temperature range of interest in which acids contact the ferrous alloys in the petroleum industry is from about ambient temperature to about 230° C. Corrosion caused by strong acids is more severe when the metal-acid contact takes place at higher temperatures. Strong acids are used in oil wells for cleaning well bores, fracking and also to stimulate them when their output decreases. One aspect of this invention is to be able to use effectively low water solubility additives which when added to acids reduce their corrosive effects on metals. Another aspect of this invention is to provide corrosion reduction additives. Yet another aspect of this innovation is to teach materials which eliminate/reduce ferric ions which are responsible for corrosion and sludge formation. Many of the formulations made using the embodiments below may have other components which may be inert or have mild inhibiting characteristics, but are added as carriers, solvents, colorants for distinguishing various products, etc. Some of these are water, alcohols (usually C1 to C4), glycols (e.g., polyethylene and polypropylene glycols) with molecular weight of about less than 400, etc.

The present invention provides additive(s), and compositions (or formulations) that include the additive(s) that provide corrosion inhibiting characteristics to the type of acidic compositions that are found in the petroleum industry, and which additives can have use in corrosion inhibiting characteristics to acidic compositions for other industrial applications.

In one of its basic aspects, a composition according to the present invention comprises an acidic solution with a corrosion inhibiting additive, where the corrosion inhibiting additive comprises a low water solubility material which is dispersible in an aqueous medium as particles whose surfaces are modified by a surface functionalization agent with a molecular weight of at least 60.

In a more specific form of this composition, the low water solubility material comprises a cuprous salt. Moreover, the corrosion inhibiting additive may be further combined with a material which additionally provides ferric ion reduction properties.

Also, the surface functionalization agent is preferably selected from at least one of PVP, PVP copolymer, surfactant, an organic acid and a salt of an organic acid.

The corrosion inhibiting additive can comprise at least one low solubility surface functionalized particles of cuprous salt, and at least one additional metal compound selected from a Cu compound which is different from surface functionalized cuprous salt and compounds of a metal selected from Li, Na, K, V, Co, Mo, Ta, Sn, Bi, Mn and W.

Still further, the corrosion inhibiting additive further comprises at least three materials selected from the following categories, wherein at least one material is selected from each of these categories:
(a) cationic surfactant;
(b) phenylpropanoid, and
(c) and a material selected from at least one of a monomeric material and a nitrogen containing material.

Still further, the monomer can be acetylenic; the phenylpropanoid is cinnamonaldehyde; the nitrogen containing material can be selected from quinolines, nicotinic acid, and PVP containing polymer; and the surfactant can be a cationic salt selected from ammonium, phosphonium, imidazolium, pyridinium, pyrrolidinium, pyridazinium, pyrimidinium, pyrazinium, imidazolium, pyrazolium, and triazolium salts containing halide anions. More specifically, the acetylenic monomer can comprise propargyl alcohol or its derivative, the cinnamonaldehyde can comprise trans-cinnamonaldehyde, and the cationic salt has at least one alkyl chain with an average length of C12 to C15. The additive can also contain a corrosion inhibition intensifier which comprises at least one of a compound of V, Co, Mo, Ta, Sn, Bi, Mn, W, Cu and I. As an example, the corrosion inhibition intensifier can be selected from CuI, LiI, KI and NaI. The acidic compositions containing these corrosion inhibitors may also contain additives which reduce ferric ion species.

As applied specifically for acids used in the petroleum industry, an iron control formulation is provided for reducing ferric ion species in an acidic solution employed in the petroleum industry, the formulation comprising a reducing agent and a cuprous compound selected from at least one of cuprous halides, cuprous oxide and cuprous acetate. Preferably, the cuprous halide is copper iodide, the cuprous compound is added as particles whose surfaces are modified by a functionalizing agent, and the reducing agent is a non-sulfur containing material.

Additives that provide both corrosion inhibition and reduction of ferric ions comprise at least four materials, selected from:

(a) cationic surfactant;
(b) at least one of a monomeric material, a nitrogen containing material.phenylpropanoid;
(c) a reducing agent; and
(d) cuprous/transition metal salts The above additive package may also comprise an additional iodine containing compound. In the above additive package, preferably the monomer can be acetylenic; the phenylpropanoid is cinnamonaldehyde; the nitrogen containing material can be selected from quinolines, nicotinic acid, and PVP containing polymer; and the cationic surfactant can be a salt selected from ammonium, phosphonium, imidazolium, pyridinium, pyrrolidinium, pyridazinium, pyrimidinium, pyrazinium, imidazolium, pyrazolium, and triazolium salts containing halide anions. Preferred reducing agents do not comprise sulfur and a preferred cuprous compound is CuI.

The corrosion inhibitors/intensifiers of this invention may be combined with additional corrosion inhibitors (including conventional corrosion inhibitors) or corrosion inhibition intensifiers (CIIs). One aspect of this innovation is the use of dispersible particles of solid corrosion inhibitor or CII components which have low water solubility. A highly preferred method of adding such materials according to the present invention involves preparing surface functionalized particles which can easily be dispersed in aqueous media. Low water solubility materials are defined as those which at room temperature have a water solubility of less than 100 mg/liter and preferably less than 15 mg/liter of water. The surface functionalization is typically carried out using materials which have a molecular weight of at least 60 and preferably at least 80 and most preferably at least 100. More on surface functionalization and preparation of such particles is provided in published US patent application 2014/0271757 the disclosure of which is included herein by reference. Corrosion inhibitor formulations which combine several inhibitors synergistically is also an object of the present invention, as are corrosion inhibitors that reduce ferric ions to mitigate the corrosion caused by such ions and also to mitigate sludge formation caused by ferric ions.

Some Exemplary embodiments of the present invention are described below.

Embodiment 1

This embodiment is directed to the use of particles of low water solubility metal salts which provide good corrosion inhibition. This is done by producing particles of these materials wherein the surfaces of the particles are modified (functionalized particles) so that these may be dispersed uniformly in acidic media. Preferably these particles are pre-formed prior to their addition to the acids. A preferred range of size of such particles is between 3 and 1,000 nm, more preferably between 50 and 500 nm and most preferably between 100 and about 300 nm. A preferred low water solubility material for this purpose is cuprous iodide. The functionalization agents should have a molecular weight of at least 60, preferably at least 80 and more preferably at least 100. One may use one or more than one functionalization agent. Preferred surface functionalization agents are either water/acid compatible or are hydrophilic. Some of the preferred materials are PVP, PVP copolymers, chitosan, surfactants (ionic and nonionic), organic acids and salts of organic acids.

Embodiment 2

In another embodiment, the corrosion inhibition formulation comprises surface functionalized particles as corrosion inhibitor intensifiers (CII). This means that the formulation comprises other corrosion inhibitors, but CII are added to further enhance the corrosion inhibition. Typically CII are used when it is desired that the acids will contact metals at a temperature greater than about 200° F., and preferably once the temperatures reach 250° F. or higher. Although any corrosion inhibitors may be used to which these CII are added. The preferred corrosion inhibitors comprise one or more of (a) a polymer which binds to iodine (b) monomers, (c) phenylpropanoids and/or carotenoids, (d) quinolines and (e) an ionic material selected from at least one of an organic acid, salt of an organic acid and a cationic surfactant. Additional CII with different chemistry may also be used in the formulation, and some of the preferred ones are water soluble metal salts, including iodides including water soluble iodides.

Embodiment 3

In another embodiment, the corrosion inhibitor formulation combines at least three corrosion inhibitors of which at least one is a cationic surfactant, the second is a phenylpropanoid and the third is selected from one of a monomeric material and a nitrogen containing compound. Such formulations may comprise additional inhibitors, which may be selected from these three classes of materials or of other types. The corrosion reducing effects of the above formulation may be intensified by using metal salts such as those listed in Embodiment 2. Some of the preferred cationic surfactants are ammonium salts with average alkyl chains longer than about C8 and most preferred embodiments have average alkyl chains of C12 to C15. The preferred phenylpropanoid is cinnamonaldehyde and preferred monomers are acetylenic monomers and preferred nitrogen containing compounds are PVP containing polymers, quinolines and nicotinic acid. It is also preferred that the formulation contain a higher weight percentage of the third inhibitor type (i.e., monomeric material or a nitrogen containing compound) as compared to the other two inhibiting constituents. Any of the corrosion inhibitor intensifier (CII) as described in Embodiment 4 and/or an iodine (iodide) containing compound may be used to improve or intensify the corrosion inhibition of the formulations of this embodiment.

Embodiment 4

In yet another embodiment, the corrosion inhibitor formulation comprises at least two CIIs. The first of these two CII comprise a cuprous salt, and the second CII comprises a metal compound (including metal salts) where at least one metal is selected from Li, Na, K, V, Co, Mo, Ta, Sn, Bi, Mn, W and a Cu compound which is different from the first CII. Iodides of alkali metals are preferred as the second CII.

Embodiment 5

This embodiment relates to formulations to be used with acids (usually strong acids) for reduction or control of ferric ions by use of cuprous compounds in these formulations.

These formulations may be made only for ferric ion control, or both for ferric ion control and reduction of corrosion due to acid/metal reaction. Water insoluble cuprous compounds can be used as surface functionalized particles. Use of cuprous compounds results in highly effective ferric control formulations. Preferred cuprous compounds are cuprous halides, cuprous oxide and cuprous acetate. Of these a more preferred compound is CuI. The reduction of ferric ions leads to the mitigation of ferric ion corrosion and/or reduction of sludge caused by ferric ions. This embodiment also envisages the use of cuprous compounds such as CuI both as a generic corrosion inhibitor (Embodiment 1) or corrosion inhibitor intensifier (CII) (Embodiment 2) along with at least one reducing agent so that these formulations work for their intended purpose as laid out in Embodiments 1 and 2, while also providing ferric ion control. Some of the reducing agents are sulfites, thiosulfates, thioglycolates, ascorbic acid, sodium ascorbate, erythorbic acid and sodium erythorbate. The preferred reducing agents are non-sulfur containing materials. In another variation any ferric ion reducing composition may be added to the corrosion inhibitors of Embodiment 3 to result in those compositions which result both in effective ferric ion reduction and also in superior corrosion protection of metallic materials against acidic corrosion.

Embodiment 6

In this Embodiment, formulations which provide Ferric ion control in acidic solutions comprise metal compounds containing multivalent transition metals, preferably selected from V, Co, Mo, Ta, Sn, Bi, Mn and W, together with a source of iodine and a reducing agent. The selection of the reducing agents is the same as in Embodiment 5. At least a portion of iodine can be provided by the metal compound.

BRIEF DESCRIPTION OF THE DRAWINGS

FIG. 2: Optical transmission showing reduction kinetics of ferric ions using various compositions.

DETAILED DESCRIPTION OF EMBODIMENTS OF THE INVENTION

Figure 1:
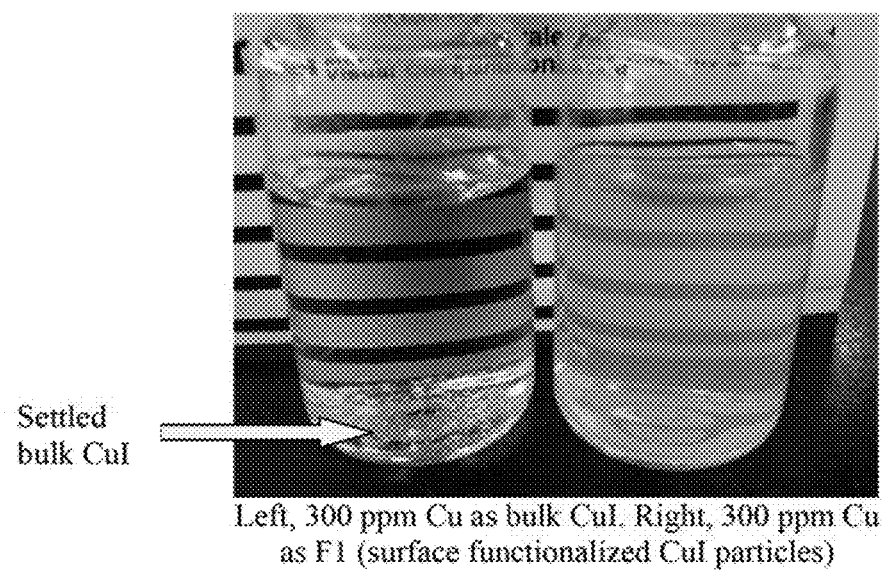
FIG. 1: Shows uniform dispersion of an inventive formulation comprising surface functionalized particles of CuI vs settling of bulk copper iodide in 15% HCl.

Corrosion of metals is an important industrial issue, particularly when ferrous alloys contact acids. Strong acidic solutions are used for cleaning, industrial processes, and in the petroleum industry. Corrosion becomes more severe when the acid contacts metals at elevated temperatures; and it is not uncommon for deep petroleum wells to have temperatures as high as 230° C. or even higher.

It is preferred that the corrosion inhibition additive comprising the various constituents described above be added to treatment acids in concentrations of less than about 5% (i.e., 50,000 ppm), preferably less than about 2% and most preferably less than about 0.5% (all by weight). The concentration (and the ratio of the constituents amongst themselves) is dependent on the corrosiveness of the liquid being used, the type of metal being protected, the temperature at which the interaction will happen, and also the duration for which the corrosion protection is being sought. Since the addition of these components increases cost and some of these may have toxicity issues at large concentrations, it is always desired that the additive concentration for a given task should be as small as possible as long as it attains its objective. The chart below shows an approximate guideline for desirable concentration limits of corrosion inhibitors used in strong acids (e.g., 15% HCl) as a function of maximum temperature at which the acids and the metals interact.

| Maximum Temperature, °C. | Preferred | More Preferred |
|---|---|---|
| | Maximum concentration of entire corrosion inhibition package, ppm | |
| 100 | 6,000 | 3,000 |
| 150 | 10,000 | 5,000 |
| 200 | 20,000 | 10,000 |
| >200 | 50,000 | 15,000 |

U.S. Pat. No. 3,773,465 teaches the use of cuprous iodide along with known corrosion inhibitors to reduce corrosive aspects of hydrochloric acid (such as 5 to 34% HCl) solutions on ferrous metals. These acids are used to stimulate petroleum wells, and function by dissolving sediments and deposits blocking the porosity in rocks so that the well production can be restored. As the wells become deeper, particularly in off-shore drilling, the temperatures increase with increasing depth and the corrosive power of these acid solutions also increases. It was taught in the above patent that cuprous iodide could be added or produced in situ by the reaction of a copper salt (or copper oxide) and a water soluble iodide salt such as NaI and KI. It was preferred that there was a small excess (5 to 15%) of the water soluble iodide salt as compared to the stoichiometric amount of copper salt. A concentration range of 25 to 25,000 ppm of CuI was needed to reduce corrosion in a temperature range of 150° F. (about 66° C.) to 450° F. (232° C.). It was important that cuprous iodide be combined with small molecular weight organic compounds belonging to the class of acetylenic or a nitrogen containing compound(s) (e.g., also see U.S. Pat. No. 3,514,410 for description of corrosion inhibitors using acetylenic and nitrogen compounds, wherein such list is included herein by reference). The impact of addition of CuI on corrosion was particularly noteworthy with increasing temperature. Since CuI was used with other small organic molecules as described above, it was called as "corrosion inhibition intensifier (CII)". However, use of copper iodide has been difficult due to its low water solubility, and CuI is not currently used in this application, it is also recognized in a US patent application 2009/0156432 that as CII, cuprous iodide, is effective at high temperatures to up to about 350° F.

US published patent application 2011/0100630 teaches that the use of already-formed cuprous iodide is problematic and teaches a method of in-situ formation of cuprous iodide. This application notes that when cuprous iodide powder is directly added to an acid, it does not have sufficient solubility to make its use practical. To overcome this problem, the application teaches generating cuprous iodide in situ from the reaction of a soluble iodide salt and a soluble copper salt mixed on the fly at or near the wellhead. The application suggests using cupric acetate along with KI in acids to generate CuI.

When cuprous ions (e.g. introduced by using CuI or another cuprous compound) are introduced in a corrosion inhibition formulation, these also work as reducing agents (to reduce ferric to ferrous ion). Ferric ions (from oxidized iron scale-rust present in pipes) cause several problems. First the presence of ferric ions especially when chloride ions are present (e.g., when HCl is present) enhance corrosion of steels ($2Fe^{3+}+Fe \rightarrow 3Fe^{2-}$) and also of many other metals and alloys. In addition to corrosion, particularly in oil and gas wells, ferric hydroxide begins to precipitate from hydrochloric acid solution when the pH of the acid increases to a value of about 2.5 and greater. This precipitation is serious when an acid, such as hydrochloric acid, containing dissolved ferric iron (which may be coming from rust) is used to react with a subsurface, acid soluble formation such as limestone. The acid reaction with the limestone causes the pH of the acid solution to rise. In addition, high concentrations of acid, e.g., HCl about 15% and greater, can also cause the development of sludge when the acid is placed in contact with certain types of crude oil. The sludge formation is increased when the acid which is in contact with the crude oil also contains ferric ions. Such precipitation and sludge formation make the recovery and the flow of oil difficult. Thus in acidization treatments, control of ferric ion is also important, for which CuI functionalized particles can provide both corrosion protection by reducing the acid/metal interaction and also by reduction of ferric ions. CuI provides both, a source of cuprous and iodide ions.

U.S. Pat. No. 8,003,581 teaches use of sludge reduction by using a water soluble cupric salt (cupric chloride), source of a water soluble iodide salt (potassium iodide) and a sulfur compound selected from at least one of sulfite (e.g., sodium sulfite) salt and/or a bisulfite salt (sodium bisulfite). The present invention found that one can use cuprous salts rather than cupric salts, and in particular cuprous iodide to substitute completely or in part for the sources of copper and iodide ions in the formulation described in the referenced patent and get efficient ferric reduction. It was also determined that when cuprous compounds (e.g., cuprous salts) are used, it is not necessary to use sodium sulfite or sodium bisulfate to get rapid reduction of ferric to ferrous iron. If cuprous compounds are not soluble in the formulations, then these materials may be added as functionalized particles to obtain good dispersion while still being effective in reducing ferric ions. In some cases if the introduction of sulfur containing reducing agents is not desired since these compounds or their reactive products can be a potential food source for anaerobic sulfate reducing bacteria, then one may also use non-sulfur containing reducing agents. Use of low water solubility cuprous salts such as CuI as surface functionalized particles provides the capability of releasing ions for an extended period of time, thus continually providing a source of ions for ferric reduction and providing corrosion protection. Such particles with proper functionalization may also attach to the pipe (steel) surfaces thus providing a protectant species at the point of corrosion and hereby enhancing their effectiveness.

Embodiment 1

Although bulk CuI powder may dissolve in or react with acidic solutions at elevated temperatures, it is difficult to achieve good dispersion under typical mixing conditions (from about 0° C. to 50° C.), and the reactive method to produce CuI particles in-situ is not desirable (see US published patent application 2011/0100630) as the reaction conditions near the well head may change (e.g., change in temperature during the day or with seasons), and as this mixture travels down the well, the temperature and the pressure changes rapidly. As one embodiment of this innovation, it is much more preferable to use pre-formed dispersible particles with low solubility in aqueous solutions including acidic aqueous liquids. One way to pre-form such particles, such as of CuI, is to form particles with their surfaces functionalized so that the particles remain suspended in the acidic fluids and remain uniformly dispersed. The size of surface functionalized particles which disperse in a liquid medium may be any as long as they remain dispersed, and a practical range is from about 3 to 1,000 nm. The size of the dispersed particles is dependent on the viscosity of the liquid medium, the type of functionalization used, and the difference in density between the liquid and the particles. For uniform particulate dispersion it is preferred that the average particle size be about 1000 nm or lower, more preferably below 300 nm and most preferably between 100 and 300 nm. One may also combine particles of different sizes/compositions. As an example, one may combine particles about 300 nm in average size with those less than 30 nm in average size, or one may combine particles about 1,000 nm in average size with those smaller than 200 nm in average size, etc. In one embodiment, the present invention teaches the use of those ingredients which improve corrosion inhibition, but have low water and/or acid solubility (in a range of about 0 to 60° C.). When particles of these ingredients are surface functionalized, they become easily dispersible in water or in the acid formulations in which they are to be used. In some instances, easily dispersed particles may also be easier to solubilize in aggressive solvents, such as acids. The corrosion inhibition formulations comprising these particles may further comprise additional corrosion inhibitors.

The processes used to form surface functionalized particles and functionalization agents are well described in published US patent applications 2014/0271757 and 2013/0315972 all of which are included herein by reference.

Low water solubility cuprous compounds are preferred as a source of corrosion inhibition materials (or copper salts). These include $Cu_2O$, CuCl and CuI. CuI is most preferred in many cases as it provides both a source of cuprous metal ions and also iodide ions, as both of these ions show corrosion inhibition properties. Functionalized particles of CuO may be used in some cases.

Another class of solids which are insoluble or have low water solubility are materials (or salts) with more than one cation (e.g., mixed metal iodides and oxides), such as $K_4BiI_7$, which is an iodide salt of both an alkali metal (K) and a non-alkali metal (Bi). The low water solubility salts may also comprise more than one non-alkali metals such as CuAgI (a solid solution of equimolar CuI and AgI), which may be written generically as $Cu_xAg_yI_z$ and x+y=z represents a material where CuI and AgI are present in any proportion. Another example is $Bi_xMo_yO_z$ (a solid solution of $Bi_2O_3$ and $MoO_3$) represented generically by $Me1_xMe2_yO_z$ where Me1 and Me2 are different metals.

During the production of surface functionalized particles, the functionalizing agents should be present while the particles or new surfaces are being formed. The particles may be formed either by chemical synthesis, or by physical grinding from larger particles. The amount of surface functionalizing agent increases with decreasing particle size, there is an increase in the surface area of the particles. While any ratio of the metal salt particles and the functionalizing material may be used, a preferred weight ratio (metal salt to functionalizing agent) in a range of about 25:1 to 1:20 and more preferably in a range of about 20:1 to 1:2. The molecular weight of the functionalization agents should preferably be at least 60, more preferably greater or equal to 80 and most preferably greater or equal to 100.

Although an important purpose of the surface functionalization agent is to prevent particles from agglomeration (e.g., promoting suspension stability in liquid mediums), in some cases functionalization agents may also assist in increasing in corrosion inhibition, or help in their attachment to the metallic surfaces which are being protected.

Functionalized particles are typically produced by synthesizing or producing particles in a liquid media in presence of functionalizing agents. The resulting particle suspensions may subsequently be dried into solid powders or used in the liquid state so that they can be metered volumetrically and pumped into acidic solutions. Solid powders can be stored and transported more compactly and at a lower cost. The size of such dried powder particles will in general be larger than the size of the individual functionalized particles, as each of the dry particles or granules will comprise several functionalized particles. The size of the dried powder particles should be greater than about 1 micron, preferably greater than about 10 microns and most preferably greater than about 100 microns. This allows downstream operations using the dry powders to be conducted safely without having the powder particles become airborne. The larger particles do not get airborne easily; and 100 micron particles are unable to penetrate thoracic airways in lungs and are safer to use in an industrial setting. The dried powders may then be used to make corrosion inhibition products by adding them to a liquid carrier such as water and/or acids. When these powder particles are added to the carriers, these particles will break down and result in a uniform dispersion of the smaller functionalized particles.

The preferred surface functionalization materials are hydrophilic and/or water compatible and these may be small molecules or polymeric. Although any functionalization agents may be used, some of the preferred functionalization agents are discussed below.

The agents which are selected should be compatible with the other ingredients used in the corrosion inhibition formulation and the acids. Some of the other additives used for corrosion inhibition formulations are viscosity modifiers, iron control agents, sludge formation reducers—e.g., by reducing their formation, or wetting and floating mineral particles such as sandstone and carbonates, controllers for calcium sulfate (anhydrite) settlement, reducers of viscous formations of acid or spent acid/oil products, etc. For greater compatibility with these ingredients and the corrosion inhibitors one may also select one or more of these ingredients for surface functionalization.

Some specific functionalization agents include natural polymers such as starch, guar gum, chitosan, glycogen and protein based polymers. Synthetic polymers such as polyvinyl acetate, poly(vinyl alcohol) (PVA), polyethylamine, polyurethanes, polyacrylic/methacrylic acid, poly(vinylpyrrolidone) (PVP) and polyamides (nylons, polyacrylamides), polyimines (e.g., poly(Schiff bases), conjugated polymers such as polyisoprene, polybutadiene, acetylenic polymers, inherently conductive polymers such as polyaniline, polypyrrole and polythiophenes (in conducting or non conducting states), and their copolymers including random, block and graft copolymers are all included, (copolymer of a given polymer is defined as any polymer which has sequences of the given polymer (or prepared from monomer compositions, where such compositions comprise monomers from which the given polymer is prepared)) and the other part of the copolymers can be any. Of these the preferred materials are PVP and copolymers, s (PVP copolymers means all polymers which have any segments of polymerized vinyl pyrrolidone). Copolymers of PVP along with at least one of polycaprolactam, polyolefin and poly vinyl acetate are preferred. In the above list there are some hydrophobic polymers, since preferred materials are hydrophilic or water compatible, those should be used as copolymers where the comonomers are those which would result in water compatibility. One may also use biodegradable polymers and copolymers such as polylactic-PLA acid and poly glycolic acid-PGA.

Each of the above polymers may have a range of molecular weights, typically in the range of about 1,500 and 1,000,000 Daltons, although molecular weights less than 200,000 are preferred, and molecular weights less than 100,000 are most preferred. One may also combine several functionalization agents, and these may be also selected from polymeric and nonpolymeric materials.

The general class of organic acids for surface functionalization includes amino acids and salts of all these acids. Some preferred examples of organic acids (including their salts) are acetic acid, citric acid, ascorbic acid, erythorbic acid, lactic acid, sodium acetate, sodium citrate, sodium lactate, sodium ascorbate, sodium erythorbate, etc. Some of the preferred amino acids are arginine, lysine, aspartic acid, glutamic acid, glutamine, glycine, alanine and leucine.

The surfactants (non ionic, anionic and cationic) along with salts of organic acids may be used as surface functionalization agents. The preferred surfactants for use with metal salts are anionic and non-ionic surfactants. As discussed later surfactants may also be used as corrosion inhibitors, particularly cationic surfactants. However, one has to be careful in mixing anionic and cationic surfactants together or even using one as a surface functionalizing agent and the other as a corrosion inhibitor in the same formulation so that these do not interact negatively and cause the system to destabilize. Sometimes these materials may not be compatible with each other in a formulation which needs to be stored and transported, but would be acceptable for this use if they both were added to the acid separately and then upon mixing formed a compatible system.

Examples of some specific surfactants are Brij, Tween (polysorbate), Triton X-100, benzethonium, benzalkonium, dimethyldialkylonium, alkylpyridinium and alkyltrimethylammonium cations with any anion, e.g., bromide, chloride, acetate or methyl sulfate, non-ionic surfactants such as silicone-ethylene oxide/propylene oxide copolymers (e.g., OFX-0190, OFX-0193 and OFX-5329 from Dow Corning, Midland, Mich.), Sodium dodecyl sulfate (SDS), sodium caproyl sulfonate, sodium lauryl sulfate, sodium laureth sulfate, cetyltrimethylammonium chloride or cetyltrimethylammonium bromide, methyl tricapryl ammonium chloride, (all available from Sigma-Aldrich Co, Milwaukee, Wis.).

It is preferred that the organic cation salts (cationic surfactants) for surface functionalization are selected not only as ammonium salts as listed above but may be preferably selected from at least one of ammonium, phosphonium, imidazolium, pyridinium, pyrrolidinium, pyridazinium, pyrimidinium, pyrazinium, imidazolium, pyrazolium, and triazolium. For example, phosphonium salts are particularly stable at elevated temperatures and are useful for high temperature applications. Many of the materials belonging to this class of materials are also called ionic liquids, i.e., these are salts with a low melting point so that at room temperature or at least about below 100° C. these salts are in a liquid form. In addition, the anions of these salts should preferably be halides selected from at least one of chloride, bromide and iodide, and the most preferable being chloride and iodide. The preferred salts should also be soluble in the aqueous and the desired acidic medium.

Embodiment 2

In another embodiment, the corrosion inhibition formulation comprises surface functionalized particles of low solubility solid materials as corrosion inhibitor intensifiers (CII). A preferred CII comprises surface functionalized particles of cuprous salts, especially CuI. This means that the formulation comprises of other corrosion inhibitors, but CII are added to enhance synergistically the corrosion inhibition. Typically CII are used when it is desired that the acids will contact metals at a temperature greater than about 200° F. Although these CIIs may be used with any inhibitors, some standard examples of corrosion inhibitors used in the industry are acetylenic alcohols, alkenyl phenones, aromatic aldehydes, nitrogen containing heterocyclics, quaternary salts and condensation products of carbonyls and amines, potassium iodide, sodium iodide, lithium iodide. Some the preferred corrosion inhibitors for use with cuprous salts, particularly CuI belong to the following classes of corrosion inhibiting materials (a) a polymer which binds to iodine (b) monomers, (c) phenylpropanoids and carotenoids, (d) quinolines and (e) an ionic material selected from at least one of an organic acid, salt of an organic acid and a cationic surfactant. Additional CII may also be used in the formulation, and some of the preferred CII are water soluble metal salts, including iodides and sources of water soluble iodides (e.g., NaI, KI). Some of these classes of corrosion inhibitors are discussed in more detail below. Also many of the corrosion inhibitors discussed in this embodiment may also be used along with the other embodiments in this invention.

It is believed that when iodide/iodine are present with corrosion inhibitors, these attach to the metallic surfaces which results in corrosion inhibition, thus polymers that bind strongly to iodine are preferred so that the metallic surfaces have a superior coverage of acid resisting materials. Since PVP and its copolymers bind strongly with iodine, they represent preferred class of materials for use as corrosion inhibitors which bind strongly with iodine. PVP and its copolymers are used in many applications which relate to food, drugs and cosmetics in large quantities with a good safety record. The present invention found that PVP and its copolymers along with a source of iodine and when added to other corrosion inhibitors provided a very high level of corrosion protection. Thus substituting a part of the corrosion inhibition formulation partially with the above resulted with low toxicity corrosion inhibitors. There are other polymers which also bind strongly with iodine e.g., see Moulay (Molecular iodine polymer complexes, J Polym Eng 2013; 33(5): 389-443). These polymers are used when there is a source of iodine/iodide present in the corrosion inhibition formulation, such as water soluble iodide salts, iodine or even low water solubility metal iodide particles which are surface functionalized.

Monomers include vinyl and acetylenic type of materials and should preferably be water soluble or an aqueous solvent which may be formed by mixing water with other solvents, e.g., alcohols. Vinyl monomers and the preferred acetylenic monomers are depicted by the following general formulas, where these materials have a acetylenic or a vinyl group respectively:

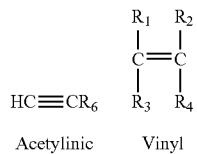

Acetylinic    Vinyl wherein $R_6$ is preferably selected from hydroxyl, hydroxyalkyl groups so that these monomers are compatible with aqueous solutions. For Vinyl monomers, $R_1$, $R_2$, $R_3$ and $R_4$ are preferably selected from hydroxyl, hydroxyalkyl, —H, alkyl, phenyl, substituted phenyl groups, acrylic, acetate, carboxylic and sulfonic groups. Another representation of acetylenic monomers is as given below:

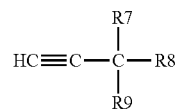

wherein one of R7, R8 or R9 are preferably a hydroxyl or a hydroxyalkyl groups and the others are the same or are —H, alkyl, phenyl or substituted phenyl groups. For example commercially some of these monomers are available as propargyl alcohol and from BASF (Germany) under the trade name of Korantin® PP and Korantin® PM.

The corrosion inhibitor may also be selected from one or more of phenylpropanoids and carotenoids. Phenylpropanoids are derivatives of an amino acid phenylalanine, and a preferred Phenylpropanoid is cinammonaldehyde (e.g., trans-cinammonaldehyde is highly preferred). Quinoline (which includes their derivatives) may also be used in the corrosion inhibition package. Some of the common quinolines used for corrosion inhibition of mild steels are quinaldine and quinaldic acid.

The corrosion inhibiting formulation may also comprise ionic materials such as organic acids, salts of organic acids, cationic and anionic surfactants. The general class of organic acids is described in more detail below. Preferred anionic surfactants have an amine, ammonium, amide and urethane functionality. Some preferred examples of such anionic surfactants are sodium lauroyl sarcosinate, ammonium lauryl sulfate.

Organic acids and salts of the organic acids: These materials may be added to the mineral acid formulations as co-corrosion inhibition intensifiers, for example formic acid is also considered a CII, specially under conditions of high temperature (typically about 250° F.) and pressure of about 1,000 psi or higher. Thus the formulation may have more than one CII including the surface functionalized particles of this invention.

Embodiment 3

In another embodiment, the corrosion inhibitor formulation combines at least three materials of which at least one is a cationic surfactant, the second is a phenylpropanoid and the third is selected from at least one of a monomeric material and a nitrogen containing compound. It has been observed that not only does one obtain synergistic effects by combining these, but also some corrosion inhibitors are superior in limiting the weight loss while some others at limiting pitting corrosion, thus providing superior performance as a mixture. It is also preferred that the formulation contain a higher weight percentage of the monomeric or the nitrogen containing material as compared to the other two constituents. It is also preferred that the monomeric material and/or the nitrogen containing material and the phenylpropanoid together exceed the amount of the cationic surfactant by a factor of two or more by weight and preferably by a factor of 8 or more and most preferably by a factor of 15 or more. A desirable descending concentration order by weight is monomeric component and/or nitrogen containing material, followed by phenylpropanoid and the cationic surfactant. Cations for cationic inhibitors are usually selected from one of ammonium, phosphonium, imidazolium, pyridinium, pyrrolidinium, pyridazinium, pyrimidinium, pyrazinium, imidazolium, pyrazolium, and triazolium. For example, phosphonium salts are particularly stable at elevated temperatures and are useful for high temperature applications. The preferred anions for the cationic surfactants are halides; and of the halides, chloride and iodide are preferred. Further, the anions have at least one alkyl chain, with average lengths in the range of C8 (alkyl chain with 8 carbon atoms) or longer, and particularly surfactants with average C12 to C15 alkyls are most preferred. Preferred monomeric materials belong to the class of acetylenic monomers, preferably propargyl alcohol and its derivatives and particularly those which contain hydroxyalkyl groups. A preferred phenylpropanoid is cinnamonaldehyde, such as transcinnamonaldehyde. Preferred nitrogen containing compounds belong to quinolines, PVP and nicotinic acid containing materials. The above inhibitor formulation may have additional inhibitors and several of them are taught elsewhere in this specification. The corrosion effects of the above formulation may be intensified by using any known intensifiers which are compatible with this formulation including formic acid for high temperature and pressure application and those the principles of which are taught in Embodiments 2 and 4. For example, any of the first CII (Embodiment 2), second CII (Embodiment 4) and an iodine (iodide) containing compound may be used to improve or intensify the corrosion inhibition of the formulations of this embodiment. Some of the preferred materials from this list are CuI, NaI, KI and chlorides of copper and manganese.

Embodiment 4

In yet another embodiment the corrosion inhibitor formulation comprises at least two CIIs. The first of these CIIs comprise particles of a cuprous salt, and the second CII comprises a metal compound (including metal salts) where at least one metal is selected from Li, Na, K, V, Co, Mo, Ta, Sn, Bi, Mn, W and a Cu compound which is different from the first CII. All of these metals other than the alkali metals are capable of exhibiting more than one state of oxidation. The metal compounds may have high solubility or low solubility in water. If these compounds are insoluble (or have low solubility, i.e. less than about 100 mg/liter of water at room temperature) these can be added as surface functionalized particles as described Embodiments 1 or 2. Halide salts of these metals are preferred; and of the halides, the preferred are chloride and iodide. As another example one may combine CuI particles from Embodiment 2 with $CuCl_2$ to provide a lower cost but high performance intensifier, i.e., partially replacing the more expensive CuI with lower cost $CuCl_2$. Further, since some CII are superior in limiting weight loss while others limit pitting corrosion, a combination provides superior performance; or the concentration of a more expensive CII can be lowered to reduce cost but still providing an equivalent or better performance. Since these are CII, this implies that the formulation has at least one other corrosion inhibitor in addition to the two CIIs. Several of the corrosion inhibitors have been described in other embodiments.

Embodiment 5

This embodiment relates to formulations used for reduction of ferric ions by use of cuprous compounds. These formulations may be made only for ferric ion control, or both for ferric ion control and reduction of corrosion (as corrosion inhibitor) due to acid/metal reaction. In case the cuprous compounds cannot be solubilized in the formulation added to the acids or are not soluble in acids, these may be used as surface functionalized particles. Use of cuprous compounds results in highly effective ferric control formulations. Preferred cuprous compounds are cuprous halides, cuprous oxide and cuprous acetate. Of these a more preferred compound is CuI.

In this embodiment, CuI is used as a source of both copper and iodine to make formulations to reduce ferric ions. The reduction of ferric ions leads to mitigation of ferric ion corrosion and/or reduction of sludge caused by interaction of ferric ions and the crude oil. This embodiment also envisages the use of CuI both as a generic corrosion inhibitor (Embodiment 1) or corrosion inhibitor intensifier (CII) (Embodiment 2) along with the ability to reduce ferric ion concentration. For ferric ion reduction one may further incorporate additional reducing agents, and optionally additional iodide ions may also be added. Preferred additional iodide sources (or iodine containing compounds) are alkali metal iodides, alkali-earth metal iodides, iodine-polymer complexes. Since addition of sulfur compounds in formulations may potentially convert to a food source for anaerobic bacteria (sulfate reducing bacteria) in the wells which are also responsible for MIC and production of poisonous $H_2S$ gas, it is preferred not to use sulfur compounds as reducing additives. Examples of some of the preferred reducing agents are organic acids and their salts, such as ascorbic acid, sodium ascorbate, erythorbic acid, sodium erythorbate citric acid and citrates. These ferric control formulations are usually added to acids along with inhibitors so that both inhibition and ferric control is achieved when these acids (or inhibited acids) are used to treat wells. Cuprous compound containing inhibitors may naturally provide iron control, particularly those which also have a reducing agent. It is to be noted that in some cases surface functionalizing agents (e.g., in Embodiment 2) may be the same as reducing agents or may have reducing properties, such as ascorbic acid. In some cases the inhibitors may also provide reducing properties, as ascorbic acid has also been used as an acid inhibitor.

In another variation of the current embodiment, any ferric ion reducing composition may be added to the corrosion inhibitors of Embodiment 3 to result in those compositions which result both in effective ferric ion reduction and also in superior corrosion protection of metallic materials against acidic corrosion. These ferric ion reduction combinations may contain reducing agents along with other ingredients such as sources of copper and iodide ions.

EXAMPLES

Example 1: Evaluation of Corrosion Protection of Various Steels

Various steels were evaluated for corrosion protection using a solution of 15% HCl. This acid had been on the shelf for many years, thus these results are comparable to each other, but not using fresh acid which was performed on several samples as discussed in other examples below. The temperature of exposure was 60° C. The time of exposure was 20 hours. In each case 10 ml of acid was used, unless mentioned otherwise in the other examples below, the acid volume in all evaluations was 10 ml. Different steels had different shapes and masses, and the mass varied from 0.6 to 3 g but were comparable for a given steel type. Two samples were placed in each 10 ml volume of acid. An inventive formulation F1 was made by grinding CuI powder in a wet grinding mill produced by Netzsch Premier Technologies LLC (Exton Pa.), equipment model was Minicer®. Copper iodide, sodium iodide, polyvinylpyrrolidone K17, and deionized water were combined as described in the Table 5. These materials were processed together in the mill using 100 micron grinding media (3MTM Micro Milling Media ZGC) at a mill speed of 4200 RPM and recirculation pump speed of 600 RPM. The formulation used for F1 was sample 7.

TABLE 5

| Sample # | CuI (g) | PVP (g) | NaI (g) | DI-Water (mL) | Grinding Time (min) |
|---|---|---|---|---|---|
| 1 | 9 | 40 | 1 | 150 | 1000 |
| 2 | 9 | 2 | 1 | 200 | 350 |
| 3 | 9 | 2 | 0.25 | 200 | 1200 |
| 4 | 9 | 0.9 | 0.1 | 200 | 450 |
| 5 | 9 | 0.95 | 0.05 | 200 | 350 |
| 6 | 18 | 1.95 | 0.05 | 200 | 1000 |
| 7 | 90 | 9 | 1 | 140 | 350 |
| 8 | 90 | 9.5 | 0.5 | 200 | 1330 |

Each milled product appeared as a semi translucent opalescent dispersion that was stable against settling with particle sizes around 10-30 nm. The dispersions were dried to form purple colored solids under reduced pressure. Subsequent redispersal formed dispersions similar to those before drying with particle sizes around 10-30 nm. The results in Table 6 show that the inventive materials when present in 15% HCl were superior on all steels as compared to 15% HCl solution (without any additive) due to lower weight loss.

TABLE 6

Evaluation in 15% HCl, 20 hrs at 60° C.

| Metal (steel type) | Additive | Mass Loss | ST Dev (n = 2) |
|---|---|---|---|
| 1018 | None | 21.26% | 0.53% |
| 1018 | 60 ppm Cu as F1 | 7.06% | 0.31% |
| A516 | None | 4.98% | 0.27% |
| A516 | 60 ppm Cu as F1 | 0.34% | 0.01% |
| 4130 | None | 24.66% | 8.02% |
| 4130 | 60 ppm Cu as F1 | 0.78% | 0.02% |
| 304* | None | 25.91% | 1.18% |
| 304* | 60 ppm Cu as F1 | 0.60% | 0.09% |

*high chrome stainless steel

Example 2: Evaluation of Corrosion Protection Using Different Sources of Copper Ions In this experiment, the inventive formulation F1 was evaluated against other sources of copper at 60 ppm in the acid.

This experiment used cut shapes from a steel piece in a thickness of 0.025 inch (0.64 mm). The results show that the inventive formulation F1 was most effective due to the least weight loss. The acid source was same as in the earlier example. Three samples were placed in each volume of 10 ml acid.

TABLE 7

1 Week @ 60° C., 4130 steel, 15% HCl

| Sample | Additive | % Mass Loss* | St. Dev (n = 3) | RSD, % |
|---|---|---|---|---|
| A | None | 38.3% | 3.1% | 8% |
| B | 60 ppm Cu as F1 | 3.9% | 0.3% | 9% |
| C | 60 ppm Cu as Bulk CuI | 39.8% | 7.5% | 19% |
| D | 60 ppm Cu as Cu(II)Cl$_2$ | 47.2% | 19.4% | 41% |

*Initial sample weight in g varied between 0.58 to 0.75 g

Example 3: Comparison of Corrosion Inhibition by CuI Formulation Vs. Glutaraldehyde In this experiment, punched circular discs of 1 cm in diameter were used. Freshly procured acid from Sigma Aldrich was used in this experiment and also on all of the subsequent experiments unless mentioned otherwise. In all cases where 1 cm diameter discs were used, two discs were placed in each 10 ml volume of the acid unless mentioned otherwise. Thickness of the sheet was 0.025 inch (0.64 mm) and the weight was about 0.4 g. Unless mentioned otherwise in all examples the thickness of 4130 steel was the same. 4130 is a medium carbon steel with small content of Cr and Mo. Inventive formulation F1 was compared with glutaraldehyde—a very popular biocide used in the oil and gas industry. These results (Table 8) demonstrate the superiority of inventive material in inhibiting corrosion. As seen in the table from this test glutaraldehyde had no effect in inhibiting corrosion. Thus comparatively, the inventive material F1 is highly effective, both as biocide (see published US patent application 2014/0271757) and as an acid corrosion inhibitor. Corrosion inhibition is shown below in Table 8.

TABLE 8

1 Week @ 60° C., 4130 steel, 15% HCl

| Sample | Additive | % Mass Loss | St. Dev (n = 2) |
|---|---|---|---|
| A | None | 100.00% | 0.00% |
| B | 60 ppm Cu as F1 | 13.41% | 4.58% |
| D | 60 ppm glutaraldehyde | 100.00% | 0.00% |
| E | 20 ppm Cu as F1 | 17.39% | 1.44% |
| G | 20 ppm glutaraldehyde | 100.00% | 0.00% |

Example 4: Evaluation of Various Additives on Inhibition Properties of CuI

As mentioned in Example 3, this and the subsequent corrosion examples (experiments) were conducted using fresh acid. One cm diameter steel shapes were punched from the sheet as before. In this example, the CuI source in all cases was bulk copper iodide. Although bulk CuI and its combination with other materials was better than using no additive, the results show that the combination of CuI and PVP gave the best results, and the results were remarkably superior as compared to the other materials.

TABLE 9

Impact on 4130 steel after 1 Week of exposure at 60° C. in 15% HCl

| Sample | Additive | % Mass Loss | STDev (n = 2) |
|---|---|---|---|
| A | None | 100.00% | 0.00% |
| B | CuI (60 ppm) | 73.85% | 20.97% |
| C | CuI (60 ppm) + PVP (18 ppm) | 13.64% | 2.39% |

TABLE 9-continued

Impact on 4130 steel after 1 Week of exposure at 60° C. in 15% HCl

| Sample | Additive | % Mass Loss | STDev (n = 2) |
|---|---|---|---|
| D | CuI (60 ppm) + PEG (18 ppm) | 63.81% | 1.00% |
| E | CuI (60 ppm) + Polyacrylamide (18 ppm) | 54.83% | 0.33% |
| F | CuI (60 ppm) + Benzotriazole (18 ppm) | 88.96% | 11.05% |
| G | CuI (60 ppm) + SLS (18 ppm) | 81.79% | 15.53% |

Example 5: Corrosion in Brine

In this example, brine was prepared (to simulate produced water from oil wells) by dissolving 5% NaCl by weight in DI water. 10 ml of brine was used for each experiment. The samples were cut from sheets of these steels and varied slightly in weight and shape. Inventive formulation F1 was used as a source of copper which was present at 60 ppm (as Cu). After 20 hrs at 60° C., the brines containing copper additive showed deposit of copper on the steels. In a subsequent experiment no such deposition was seen on aluminum or a plastic substrate.

Additional samples were made where half (50%) of the steel surface was covered by a polymeric tape. When these were treated with brine (10 ml) containing 60 ppm Cu as earlier, the non-covered portions showed deposition of copper. The tape was removed and the plates with about 50% surface covered with copper (and as control steel sheet without copper) were put in fresh brine (no copper in the solution) at 60 C for 38 days followed by 14 days at 85° C. No additional corrosion was observed on steel sheets covered by copper in 50% of the area as compared to non-covered sheets. This shows that there was no galvanic action between copper and steel. This showed that use of surface functionalized CuI particles with PVP as the source of copper did not lead to enhanced corrosion.

Example 6: Effect of PVP and its Copolymers on Corrosion Inhibition

PVP and its copolymers are particularly important because of their strong binding with iodine and low toxicity. 1 cm diameter discs were subjected to 15% HCl (10 ml) for 20 hours. The samples were evaluated and put back in the corrosion medium for a total of 1 week and then re-evaluated. K17 and VA64 are respectively PVP polymer (with weight average molecular weight of about 7,000 to 11,000) and PVP-Poly vinyl acetate copolymer (with weight average molecular weight of 45,000 to 70,000, with 40% being vinyl acetate), both from BASF. Ganex 904 and 516 are polyolefin PVP copolymers from Ashland (New Milford, Conn.). Ganex 904 is a butylated polyvinylpyrrolidone (PVP) consisting of 10% olefin. Ganex 516 is similar to Ganex 904 and consists of 50% hexadecyl alkyl and 50% polyvinylpyrrolidone and is not soluble in water. Styleze CC-10 and Conditioneze NT-20 are also copolymers from Ashland. Styleze CC-10 is a copolymer of vinylpyrrolidone (monomer of PVP, same as PVP copolymer) and dimethylaminopropyl methacrylamide and is soluble in water. Conditioneze NT-20 is a copolymer of vinylpyrrolidone and methacrylamidopropyl trimethylammonium chloride. 1ethyl2pyrrolidone was a non-polymeric nitrogen containing material, the type of material combined with CuI in prior art for corrosion enhancement. Results are shown both after 20 hours and 1 week at 60 C in 15% HCl. In all cases other than F1, the source of CuI used was bulk CuI material.

The results after 20 hours (Table 10) show that CuI by itself and the non-polymeric nitrogen containing material along with 60 ppm copper were effective, however all other materials containing both CuI and the PVP and its PVP copolymers were much more effective. This shows that all of the PVP's and their copolymers were effective in inhibiting corrosion when used with CuI. Further as seen in samples 13 to 15, corrosion inhibition is also a function of the concentration of the inhibitor. It is surprising that surface functionalized particles of CuI by PVP were showing reduced corrosion when it was present in a very low concentration as seen in sample 14.

TABLE 10

Comparison of various PVP polymers (including copolymers) in 15% HCl on 4130 steel for 20 hrs exposure at 60 C.

| Sample | Additive | Cu | % Mass Loss | STDev (n = 2) |
|---|---|---|---|---|
| 1 | NONE | 0 ppm | 55.54% | 0.05% |
| 2 | CuI Alone | 60 ppm | 15.28% | 0.12% |
| 3 | PVP-K17 | 60 ppm | 1.20% | 0.21% |
| 4 | PVP-MW10K | 60 ppm | 1.33% | 0.11% |
| 5 | PVP-MW55K | 60 ppm | 1.66% | 0.15% |
| 6 | PVP-MW1.3MIL | 60 ppm | 2.09% | 0.26% |
| 7 | VA64 | 60 ppm | 1.76% | 0.06% |
| 8 | GANEX904 | 60 ppm | 1.89% | 0.44% |
| 9 | GANEX516 | 60 ppm | 3.93% | 1.72% |
| 10 | STYLEZE CC-10 | 60 ppm | 2.77% | 0.70% |
| 11 | CONDITIONEZE NT-20 | 60 ppm | 2.32% | 0.12% |
| 12 | 1ethyl2pyrrolidone | 60 ppm | 10.24% | 0.77% |
| 13 | F1 | 60 ppm | 1.51% | 0.02% |
| 14 | F1 | 10 ppm | 9.19% | 0.32% |
| 15 | F1 | 1 ppm | 55.30% | 0.36% |

The one week results separated the performance of the materials further as shown in Table 11. This brings out the distinction more clearly between various molecular weights of PVP. The 1.3 million mol wt PVP was effective; however, the lower molecular weight materials were more effective. This also shows that the various PVP copolymers were also effective corrosion inhibitors as seen from the mass loss and also lower standard deviation.

TABLE 11

Comparison of various PVP polymers (including copolymers) in 15% HCl on 4130 steel after one week exposure at 60 C.

| Sample | Additive | Cu | % Mass Loss | STDev (n = 2) |
|---|---|---|---|---|
| 1 | NONE | 0 ppm | 100.00% | 0.00% |
| 2 | CuI Alone | 60 ppm | 69.91% | 42.55% |
| 3 | PVP-K17 | 60 ppm | 13.17% | 1.30% |
| 4 | PVP-MW10K | 60 ppm | 10.00% | 0.43% |
| 5 | PVP-MW55K | 60 ppm | 8.04% | 1.02% |
| 6 | PVP-MW1.3MIL | 60 ppm | 30.76% | 3.90% |
| 7 | VA64 | 60 ppm | 13.33% | 1.49% |
| 8 | GANEX904 | 60 ppm | 17.85% | 4.58% |
| 9 | GANEX516 | 60 ppm | 86.34% | 4.33% |
| 10 | STYLEZE CC-10 | 60 ppm | 31.69% | 6.58% |
| 11 | CONDITIONEZE NT-20 | 60 ppm | 53.47% | 1.90% |
| 12 | (1ETHYL2PYRROLIDONE) | 60 ppm | 69.96% | 39.67% |
| 13 | F1 | 60 ppm | 15.36% | 0.04% |
| 14 | F1 | 10 ppm | 100.00% | 0.00% |
| 15 | F1 | 1 ppm | 100.00% | 0.00% |

Example 7: Evaluation of Additional Polymers and Glutaraldehyde with Cu

This table compares addition of Cu as bulk CuI (other than for the sample containing F1 which has CuI present as functionalized particles) into acidic solutions of various polymers and also to acidic solution of gluteraldehyde. The various polymers include PVP, polyacrylamide (Aldrich 434949, 10,000 MW), polyacrylic acid (Aldrich 416029, 8000 MW), polyvinylalcohol (Aldrich 36027, 9,000-10,000 MW), and polyethylenimine (Aldrich 468535). The 20 hour results show that CuI (bulk) with K17 PVP (sample 3) and F1 (sample 8, which is CuI particles surface functionalized by K17 PVP) are better performing, but all of the other polymers also reduced corrosion. Although F1 and CuI (Bulk)+K17 PVP have close inhibition characteristics, but F1 is much easier to disperse uniformly in the acid.

TABLE 12

Impact of CuI addition to various polymers and glutaraldehyde in 15% HCl on 4130 steel, after 20 hrs at 60 C.

| Sample | Additive | Cu | % Mass Loss | STDev (n = 2) |
|---|---|---|---|---|
| 1 | None | 0 ppm | 49.75% | 5.16% |
| 2 | None | 60 ppm | 17.30% | 15.52% |
| 3 | PVP-K17 | 60 ppm | 2.86% | 0.80% |
| 4 | Polyacrylamide | 60 ppm | 2.96% | 0.60% |
| 5 | Polyacrylic acid | 60 ppm | 2.80% | 0.60% |
| 6 | Polyvinylalcohol | 60 ppm | 11.30% | 11.60% |
| 7 | Polyethylene imine | 60 ppm | 8.68% | 0.49% |
| 8 | F1 | 60 ppm | 1.59% | 0.09% |

After 1 week under these conditions (Table 13), it is apparent that F1 and Bulk CuI with K17 were vastly superior. These results consistently demonstrate superior corrosion efficacy when CuI is added to PVP containing polymers.

TABLE 13

Impact of CuI addition to various polymers and glutaraldehyde in 15% HCl on 4130 steel after 1 week exposure at 60 C.

| Sample | Additive | Cu | % Mass Loss | STDev (n = 2) |
|---|---|---|---|---|
| 1 | None | 0 ppm | 98.62% | 1.95% |
| 2 | None | 60 ppm | 75.58% | 28.35% |
| 3 | K17 | 60 ppm | 13.43% | 2.21% |
| 4 | Polyacrylamide | 60 ppm | 63.62% | 14.95% |
| 5 | Polyacrylic acid | 60 ppm | 49.83% | 2.61% |
| 6 | polyvinylalcohol | 60 ppm | 66.45% | 13.98% |
| 7 | polyethtleneimine | 60 ppm | 71.31% | 31.31% |
| 8 | F1 | 60 ppm | 11.52% | 0.35% |

Example 8: Comparison of CuI, PVP, KI and their Influence on Each Other

Water soluble alkali iodides (source of iodine) are used to further enhance the corrosion inhibition. In these experiments, the iodine (iodide) content was kept the same in samples B through E. The results show that presence of copper iodide is important. Addition of only KI in sample D did not inhibit corrosion, but had a larger impact when mixed with PVP (K17). The best performing material was CuI+PVP as seen for weight loss of sample C in Table 14, but also combining PVP to a source of iodine (CuI or KI) reduced corrosion.

TABLE 14

Impact of PVP and KI as compared to CuI (4130 steel, 15% HCl, 60 C., 20 hrs)

| Sample | Additive 1 | % Mass Loss | STDev (n = 2) |
|---|---|---|---|
| A | None | 63.55% | 1.08% |
| B | CuI (60 ppm Cu)* | 25.07% | 2.17% |
| C | CuI + PVP (60 ppm Cu + 18 ppm PVP)* | 2.26% | 0.48% |
| D | KI (120 ppm I from KI) | 71.79% | 0.74% |
| E | KI + PVP (120 ppm I from KI + 18 ppm PVP) | 12.36% | 1.39% |

*These samples have 120 ppm iodide from CuI.

Example 9: Corrosion Inhibition Potential of Various Copper Salts

In this experiment various copper salts (at 60 ppm copper concentration) were evaluated by themselves against A516, a carbon steel. The steel about $1/16^{th}$ inch (1.6 mm) thick was cut in a size of about 1 cm by 1 cm and evaluated in 10 ml of 15% HCl. These results in Table 15 show that of all the copper salts tested only CuI showed significant corrosion inhibition. One should note that some of the copper salts used such as Cu(II)Cl are highly water soluble. Further, as a comparison, the corrosion inhibition was much more significant with this steel when CuI was used as surface functionalized particles (with PVP) (see also results on steel A516 in Table 6).

TABLE 15

Impact of various copper salts (cuprous and cupric) at 60 ppm copper concentration on corrosion in 15% HCl at 60° C. for 20 hours.

| Sample | Additive | % Mass Loss |
|---|---|---|
| 1 | None | 17.11% |
| 2 | Cu(I)I | 7.51% |
| 3 | Cu(I)Br | 14.74% |
| 4 | Cu(I)Cl | 13.85% |
| 5 | Cu(I)O | 14.18% |
| 6 | Cu(I)Acetate | 17.17% |
| 7 | Cu(I)Thiocyanate | 15.31% |
| 8 | Cu Metal | 14.90% |
| 9 | Cu(II)Cl$_2$ | 13.48% |
| 10 | F1 | 0.49% |

Example 10

Various natural polymers or ingredients were evaluated with 60 ppm copper (as bulk CuI) for seeing if they offer corrosion protection of 4130 steel against 15% HCl. The results were compared with PVP. These were evaluated for 20 hrs at 60° C. The results (Table 16) show that all of these polymers and materials worked better as compared to a case with no additive, but PVP was superior as compared to the others and Chitosan also looked promising. When one compares these results from those in Table 14, it appears that for materials other than PVP and Chitosan, the contribution of the other materials towards corrosion was marginal, since a significant contribution is perhaps made by the addition of CuI

TABLE 16

Evaluation of various materials in 15% HCl for 20 hrs at 60 C. on 4130 steel

| Sample | Polymeric Additive* | % Mass Loss | STDev (n = 2) |
|---|---|---|---|
| 1 | None | 59.88% | 1.93% |
| 2 | Agarose | 14.76% | 0.55% |
| 3 | K17 (PVP) | 2.17% | 0.07% |
| 4 | Chitosan | 7.25% | 0.31% |
| 5 | Carboxy methyl cellulose | 18.15% | 5.13% |
| 6 | Glycerin | 20.69% | 1.17% |
| 7 | Corn Starch | 19.02% | 1.11% |

*All of these formulations (excepting sample 1) had 60 ppm added as bulk CuI. Sample B in Example 24 shows that when only bulk CuI is present at a copper concentration of 60 ppm, mass loss was 25.07%.

Example 11: Corrosion Inhibition of High Chromium Steel

In this experiment the ferrous alloy was a stainless steel 304 (composition of such steel is 18%-20% Cr, 8-12% Ni, 2% Mn, 0.75% Si, 0.08% C in iron). These steels are known for their high corrosion resistance. Their corrosion resistance to 15% HCl was measured after exposing them at 60° C. for 20 hours and also at 100° C. for 6 hours. Two punched discs of 1 cm diameter (thickness 0.025 inch or 0.64 mm) were put in 10 ml of acid in each case. Cu concentration was varied and was added as formulation F1 (surface functionalized CuI particles with PVP where the composition for 60 ppm copper as CuI, 18 ppm PVP and 1.8 ppm NaI). The other components increase in the same proportion with increasing copper concentration. The results are also compared to bulk CuI in a concentration of 60 ppm Cu.

Data at both temperatures show that with increasing copper concentration corrosion is reduced. Increasing the temperature from 60 to 100 C increases the corrosion rate significantly, and thus requires higher amount of additive for protection. Addition of bulk CuI does not protect the steel to the same degree as the inventive formulation F1. It is important to know the well conditions accurately so that the additive package (and its concentration) can be designed accordingly.

TABLE 17

Evaluation and comparison of Inventive formulation at various concentrations

| Sample | Cu conc ppm | % Mass Loss at 60° C., 20 hrs | % Mass Loss at 100° C., 6 hrs |
|---|---|---|---|
| A | 0 | 71.22% | 53.12% |
| B | 60 as F1 | 1.97% | 22.73% |
| C | 300 as F1 | | 8.58% |
| D | 600 as F1 | 0.26% | 2.10% |
| F | 60 as Bulk | | 32.30% |

Example 12: Corrosion Inhibition of Functionalized CuI Particles with Further Additions of PVP and NaI at 85° C.

In this example corrosion of stainless steel (SS) 304 discs as in the earlier example was evaluated against 15% HCl at 85° C. for six days of exposure. This was a very aggressive test which was at higher temperature and also a longer period. The purpose of this test was to start with those corrosion inhibitor compositions which worked in earlier tests and improve the compositions further for these elevated temperatures and long times. In addition to adding copper as formulation F1 (CuI/PVP/NaI), more PVP and NaI was added as shown in Table 18 so as to evaluate different concentrations of the additives. These results show that the amounts of all of the three components, i.e., non-alkaline salt (CuI in this case) water soluble alkali halide (NaI) and binding agent PVP play an important role. Comparing the best performing sample 8, with samples 4 and 9 shows that eliminating or reducing CuI by half has severe consequences. Comparison of the results on sample 8 with those on sample 7 shows that reducing NaI by half also has a severe impact on the results. Comparing sample 8 with sample 6 demonstrates that the amount of PVP is also important. Thus in a corrosion resistant formulation all three are required in careful proportions so that one can achieve high corrosion resistance at the lowest possible amount of the additive.

TABLE 18

Corrosion comparison at 85° C. for six days in 15% HCl on SS 304

| Sample | Cu as F1, ppm | Added PVP, ppm | Added NaI, ppm | % Mass Loss |
|---|---|---|---|---|
| 1 | 300 | 900 | 100 | 100.00% |
| 2 | 300 | 900 | 200 | 56.01% |
| 3 | 300 | 1800 | 100 | 100.00% |
| 4 | 300 | 1800 | 200 | 55.59% |
| 5 | 600 | 900 | 100 | 100.00% |
| 6 | 600 | 900 | 200 | 14.84% |
| 7 | 600 | 1800 | 100 | 91.52% |
| 8 | 600 | 1800 | 200 | 3.23% |
| 9 | 0 | 1800 | 200 | 88.76% |

Example 13: Corrosion Inhibition of Functionalized CuI Particles with Further Additions of PVP and NaI at 100° C.

This experiment was conducted on SS 304 discs. As usual, the acid volume was 10 ml and two 1 cm diameter disc were put in each vessel. The results show that separate and further addition of PVP or NaI both increase the efficacy of the formulation F1 containing CuI, PVP and NaI.

TABLE 19

Comparison at 100° C. for 6 hrs, for samples containing CuI, PVP and NaI in different proportions

| Sample | Cu, ppm | PVP, ppm | NaI, ppm | % Mass Loss | STDev (n = 2) |
|---|---|---|---|---|---|
| A | 300 as Bulk | | | 13.38% | 0.97% |
| B | 300 as F1 | 600 | | 5.31% | 0.76% |
| C | 300 as F1 | | 100 | 3.40% | 1.69% |
| D | 300 as F1 | | 200 | 2.18% | 0.43% |
| E | 600 as F1 | 1800 | 200 | 1.01% | 0.65% |

The results from this and Example 28 demonstrate the need for information on the corrosion conditions in order to design a effective inhibitor composition.

Example 14: Use of Alternative Binding Agents and Comparison to PVP at 85° C.

In this example corrosion of stainless steel (SS) 304 discs as in the earlier example was evaluated against 15% HCl. The test was conducted by exposing the discs to the acid at 85° C. for 20 hours. In each case the source of CuI was inventive formulation F1 (see Example 1), in some cases F2, F3 and F4 were also used which were made using FI and adding more ingredients as described below in the proportions described below:

F2=600 ppm Cu as F1 (which includes CuI, PVP and Na)+200 ppm NaI

F3=600 ppm Cu as F1 (which includes CuI, PVP and Na)+1800 PVP+200 NaI

F4=300 ppm Cu as F1 (which includes CuI, PVP and Na)+1800 PVP+200 NaI

In each flask containing 10 ml acid, two discs were used (1 cm diameter, 0.64 cm thick) and the appropriate inhibitors added. In this experiment we also evaluated dodecylpyridinium chloride (DDPC), benzyldimethylhexadecylammonium chloride (BAC) and propargyl alcohol as binding agents, all of these have been used by themselves as corrosion protection agents (corrosion inhibitors). The first two materials are organic cationic salts and the last one a polymerizable monomer. The results show that under these conditions when 600 ppm Cu is added as F2 (which contains CuI+PVP and NaI) to either DDPC, BAC, or propargyl alcohol (PA), corrosion is highly reduced, which shows that materials of this invention may be added to the conventional corrosion agents as corrosion inhibition intensifiers. Further when DDPC, BAC, and propargyl alcohol (samples 1, 3 and 6) are used with potassium iodide (KI) a typical iodide additive which also is used for corrosion inhibition intensification. The results show that dispersible CuI also leads to corrosion inhibition intensification.

Results on sample 4 and sample 15 show that the use of dispersible CuI and bulk CuI produce about equivalent inhibition. It should be noted CuI in sample 4 is dispersible and not in sample 15, however at these concentrations and the temperature of testing bulk CuI dissolves in the acidic media. However, it is not practical in the field to use nondispersible materials as one needs the inhibitor to be in a completely dispersed form in a liquid medium so that it can be metered by pumping into the acid. Samples 7, 8 and 9 show that combining CuI with PVP and then with NaI decreases corrosion in each step. Similarly comparing samples 2 and 4, it is seen that addition of CuI (as F1) is more effective as compared to the addition of KI in reducing corrosion.

TABLE 20

Comparisons at 85° C. for 20 hrs in 15% HCl

| Sample | Corrosion protection agent at 1,800 ppm | Ppm (Additive), | source of additive | % Mass Loss | STDev (n = 2) |
|---|---|---|---|---|---|
| 1 | DDPC | None | None | 92.61% | 0.73% |
| 2 | DDPC | 60 ppm Cu | F1 | 7.95% | 1.23% |
|   | DDPC | 600 ppm Cu | F2 | 0.43% | 0.42% |
| 3 | DDPC | 200 (No Cu) | KI | 13.35% | 0.70% |
| 4 | BAC | None | None | 100.00% | 0.00% |
| 5 | BAC | 60 ppm Cu | F1 | 30.50% | 2.14% |
|   | BAC | 600 ppm Cu | F2 | 0.43% | 0.06% |
| 6 | BAC | 200 (No Cu) | KI | 21.35% | 2.65% |
| 7 | Propargyl Alcohol | None | None | 100.00% | 0.00% |
| 8 | Propargyl Alcohol | 60 ppm Cu | F1 | 25.45% | 1.48% |
|   | Propargyl Alcohol | 600 ppm Cu | F2 | 1.61% | 0.65% |
| 9 | Propargyl Alcohol | 200 (No Cu) | KI | 16.05% | 3.38% |
| 10 | F3 (300 ppm Cu) | None | None | 4.47% | 1.61% |
| 11 | blank control | None | None | 100.00% | 0.00% |

Example 15: Evaluation of Dispersible CuI, KI and PVP when Added to DDPC (Cationic Salt) Corrosion Inhibitor in 15% HCl at 85° C.

Sample 1 in Table 21 shows that DDPC by itself in the concentration used was not effective. When KI, PVP or CuI were added, the corrosion inhibition intensification was sharp. Samples 13, 14 and 15 did not use dispersible CuI, with heat and temperature eventually CuI particles seemed to have dissolved. For example, when 300 ppm Cu as bulk CuI is added to 15% HCl, it quickly settles to the bottom (see FIG. 1), whereas when the formulation in sample 12 is used the result is a translucent solution of well suspended particles throughout the solution. The latter property is very convenient in the field where components are mixed and one of them disperses uniformly right away, vs another material which may require stirring/heating, etc. for extended period of time.

TABLE 21

Comparisons SS 304 discs at 85 C. for 20 hrs in 15% HCl

| Sample | ppm Cu, source | ppm, Additive 2 | ppm, Addtive 3 | ppm, Additive 4 | % Mass Loss | STDev (n = 2) |
|---|---|---|---|---|---|---|
| 1 |  | 1800 DDPC |  |  | 75.84% | 0.37% |
| 2 |  | 1800 DDPC |  | 200 KI | 11.27% | 1.78% |
| 3 | 60 F1 | 1800 DDPC |  | 200 KI | 3.47% | 0.13% |
| 4 | 60 F1 | 1800 DDPC |  |  | 6.02% | 2.88% |
| 5 | 60 F1 | 1800 DDPC | 360 PVP |  | 7.07% | 2.72% |
| 6 | 60 F1 | 1800 DDPC | 360 PVP | 40 NaI | 4.04% | 0.62% |
| 7 | 60 F1 |  |  |  | 86.12% | 7.55% |
| 8 | 60 F1 |  | 360 PVP |  | 24.19% | 0.54% |
| 9 | 60 F1 |  | 360 PVP | 40 NaI | 18.54% | 0.66% |
| 10 | 60 F1 | 1800 DDPC | 360 PVP | 40 NaI | 4.04% | 1.07% |
| 11 | 120 F1 | 1800 DDPC | 720 PVP | 80 NaI | 2.05% | 0.07% |
| 12 | 300 F1 | 1800 DDPC | 1800 PVP | 200 NaI | 0.97% | 0.19% |
| 13 | 300 Bulk | 1800 DDPC |  |  | 0.93% | 0.24% |
| 14 | 120 Bulk | 1800 DDPC |  |  | 2.55% | 0.58% |
| 15 | 60 Bulk | 1800 DDPC |  |  | 5.67% | 0.09% |

Example 16: Evaluation of DDPC and Propargyl Alcohol Based Formulations at 100° C.

Propargyl alcohol is a polymerizing additive which is known to be effective at higher temperatures, particularly in the presence of KI. This experiment was carried out to investigate the corrosion resistance of this material as compared to an inventive formulation. The experiment was conducted using Sample 1 is an inventive formulation vs the other two samples which had potassium iodide. This shows that that the inventive formulation which used F1 and NaI as corrosion intensifiers with DDPC inhibitor was more effective as a corrosion inhibitor package.

TABLE 22

Comparison of corrosion inhibition at 100 C. for 6 hrs in 15% HCL using SS 304 discs

| Sample | Cu additive, ppm | Corrosion inhibitor, ppm | Salt, ppm | % Mass Loss | STDev (n = 2) |
|---|---|---|---|---|---|
| 1 | 300 as F1 | DDPC, 1800 | NaI, 200 | 1.31% | 0.70% |
| 2 | None | DDPC, 1800 | KI, 200 | 9.83% | 0.42% |
| 3 | None | Propargyl, 1800 | KI, 200 | 41.56% | 0.28% |

Example 17: Comparative Performance with 600 ppm Cu Formulations at 85° C. Using SS304 Spheres It was noticed that when the amount of corrosion was less than about 2%, in many cases the results had considerable scatter. This may have been because of the stress put on the discs while punching them out of the sheets, and also poor edges which in some cases could corrode faster and fall off. Thus it was decided to replace the discs with polished balls (spheres) diameter 9/32 inch (7.1 mm) with a mass of about 1.5 g and made out of SS304. In these experiments only one ball was put in each vial containing 10 ml acid.

All of the samples in Table 23 had 600 ppm of copper (other than sample 1). Sample 8 shows that although CuI as bulk at 600 ppm shows good corrosion resistance at 20 hr, but is poor when the samples are evaluated after 1 week. All of the other inventive samples (samples 2,3,4,5 and 7) performed well after 1 week. As pointed out earlier, sample 6 was not properly dispersible. Although the two PVP's i.e., K17 (average molecular weight Mw was 9,000 and Mn was 2,000) and PVP-MW55k (average molecular weight Mw was 55,000), performed equivalently in terms of corrosion inhibition, but when higher concentrations of these materials are used (such as for formulations to work at higher temperatures), the viscosity for PVP-MW55K will be higher.

TABLE 23

Comparative inhibitor performance with 600 ppm Cu on steel balls at 85 C., 20 hrs and 1 week in 15% HCl

| Sample | Cu, ppm | Source of Cu | Corrosion inhibitor, ppm | | Soluble iodide, ppm | | % Loss (20 Hr) | % Loss (1 Week) |
|---|---|---|---|---|---|---|---|---|
| 1 |   |   |   |   |   |   | 58.33% | 75.04% |
| 2 | 600 | F1 | PVP K17 | 1800 | NaI | 200 | 0.10% | 2.17% |
| 3 | 600 | F1 | PVP - MW55K | 1800 | NaI | 200 | 0.11% | 2.42% |
| 4 | 600 | F1 | PVP - MW55K | 1800 | NaI | 400 | 0.04% | 1.36% |
| 5 | 600 | F1 | PVP - MW55K | 1800 | NaI | 600 | 0.07% | 1.57% |
| 6 | 600 | Cu as Bulk* | DDPC | 1800 |   |   | 0.05% | 1.32% |
| 7 | 600 | F1 | DDPC | 1800 | NaI | 200 | 0.11% | 2.21% |
| 8 | 600 | Cu as Bulk* |   |   |   |   | 0.66% | 46.34% |

*Bulk CuI powder as obtained, prior to the formation of functionalized particles.

Example 18: Evaluation of Steel Spheres with Formulations with Functionalized Particles of CuI at 85° C.

Additional experiments were conducted on SS304 steel balls as in the earlier example. The diameter of these was 9/32 inch (7.1 mm) with a mass of about 1.5 g. Table 25 shows results at 85 C and for 20 hours of exposure in 15% HCl. These results show that all of the inventive formulations worked well (compare results from Table 23, sample 1). These results show that the corrosion resistance increases with increasing copper iodide content, and with increasing amounts of CuI, one can decrease the concentration of the other additives.

TABLE 24

Evaluation of inhibition of SS304 balls at 85° C. for 20 hrs

| Sample | Additive 1 | Additive 2 | Additive 3 | % Loss |
|---|---|---|---|---|
| 1 | 300 Cu as F1 | 1800 PVP K17 | 200 NaI | 0.24% |
| 2 | 120 Cu as F1 | 1800 PVP K17 | 200 NaI | 0.72% |
| 3 | 60 Cu as F1 | 1800 PVP K17 | 200 NaI | 1.41% |
| 4 | 300 Cu as F1 |   |   | 0.35% |
| 5 | 120 Cu as F1 |   |   | 3.28% |
| 6 | 60 Cu as F1 |   |   | 13.76% |

Example 19: Check on Result Reproducibility and Performance Comparison of Several Formulations Using SS304 Balls when Exposed at 100° C.

These experiments were also carried out using steel balls as described in the earlier experiments. The temperature was boiling (nominally 100° C.) and the exposure time was 6 hours in 10 ml of 15% HCl. Samples 6 to 10 were repeats to check the consistency of the procedure. The results show good consistency. The results show (sample 3) that addition of 1000 ppm Cu (added as 3,000 ppm of CuI) reduces corrosion significantly. However, about the same corrosion is seen in samples 15 and 16 with much lower copper content. Experiments 15 and 16 bulk CuI or the functionalized particles of CuI, formulation F4 (with PVP and NaI). Although the corrosion results were similar, bulk CuI is not dispersible. Addition of CuI to DDPC was more effective as compared to the addition of KI (compare samples 12, 13 to sample 14). In addition, introducing CuI and KI to DDPC further increased the inhibition (compare samples 14 and 16).

TABLE 25

Corrosion of SS 304 balls at 100 C. for 6 hours in 15% HCl

| Sample | ppm Cu, source of CuI | ppm, Additive 2 | ppm, Additive 3 | % Loss |
|---|---|---|---|---|
| 1 | | | | 54.83% |
| 2 | 300 Cu as Bulk | | | 4.73% |
| 3 | 1000 Cu as Bulk | | | 0.25% |
| 4 | 300 Cu as F1 | 1800 Polyacrylamide | 200 NaI | 1.22% |
| 5 | 600 Cu as F3 | | | 0.78% |
| 6 | 300 Cu as F4 | | | 0.64% |
| 7 | 300 Cu as F4 | | | 0.45% |
| 8 | 300 Cu as F4 | | | 0.67% |
| 9 | 300 Cu as F4 | | | 0.70% |
| 10 | 300 Cu as F4 | | | 0.40% |
| 11 | | 1800 DDPC | | 19.34% |
| 12 | | 1800 DDPC | 200 KI | 6.38% |
| 13 | | 1800 DDPC | 1800 KI | 1.32% |
| 14 | 300 Cu as CuI Bulk | 1800 DDPC | | 0.85% |
| 15 | 300 Cu as F4 | 1800 DDPC | | 0.33% |
| 16 | 300 Cu as CuI Bulk | 1800 DDPC | 200 KI | 0.33% |

Example 20: Comparative Efficacy of CuI Nanoparticles with Bulk CuI and NaI

CuI as bulk material, CuI as formulations F1, and NaI were combined with propargyl alcohol (PA) or dodecylpyridinium chloride (DDPC) in 15% HCl and tested for corrosion inhibition as in Example 19. Samples 1-3 & 5-7 have equivalent iodide concentrations. The results demonstrate that the addition of insoluble CuI performs better that soluble NaI at equivalent iodide concentrations (compare examples 1-3 & 5-7). The results also demonstrate that dispersible CuI performs equivalent to nondispersible bulk CuI (compare examples 2-3 & 6-7).

TABLE 26

Corrosion of SS 304 balls at 100 C. for 6 hours in 15% HCl

| Sample | ppm Cu, source of CuI | ppm NaI | ppm PA | ppm DDPC | % Loss |
|---|---|---|---|---|---|
| 1 | 0 | 709* | 2000 | 0 | 0.90% |
| 2 | 300 Cu as Bulk | 0 | 2000 | 0 | 0.29% |
| 3 | 300 as F1 | 0 | 2000 | 0 | 0.32% |
| 4 | 0 | 0 | 2000 | 0 | 31.97% |
| 5 | 0 | 709 | 0 | 2000 | 2.81% |
| 6 | 300 Cu as Bulk | 0 | 0 | 2000 | 1.08% |
| 7 | 300 as F1 | 0 | 0 | 2000 | 0.98% |
| 8 | 0 | 0 | 0 | 2000 | 20.99% |

*Corresponds to 600 ppm of iodide (same as in CuI which has 300 ppm of Cu)

Example 21: CuI with Two Corrosion Inhibitors, Propargyl Alcohol and Trans-Cinnamaldehyde CuI as F1 was combined with propargyl alcohol and/or trans-cinnamaldehyde in 15% HCl and tested for corrosion inhibition as in Example 19. The results demonstrate that satisfactory corrosion rates are attained with low amounts of dispersed copper iodide along with a propargyl alcohol or trans-cinnamaldehyde and with combinations thereof. Samples 8-11 demonstrate a synergistic effect between propargyl alcohol and trans-cinnamaldehyde when combined with dispersed CuI as F1. In Samples 1 to 9, the total amount of corrosion inhibiting formulation was at 0.3% (or 3,000 ppm). Combination of two corrosion inhibitors with functionalized CuI particles combined in the proportion shown in Sample 8 resulted in the best performance. Sample 4 and 10 have comparable performance, but sample 10 has lower amount of additive. In corrosion inhibition, it is often seen that at a certain additive concentration one reaches the maximum inhibition under specified conditions (e.g., additive type, temperature, time, acid solution used and the type of metal exposed)). Addition of more additive does not result in appreciable change in corrosion inhibition.

TABLE 27

Corrosion of SS 304 balls at 100 C. for 6 hours in 15% HCl

| Sample | ppm Cu as F1 | ppm propargyl alcohol | ppm, trans-cinnamaldehyde | % Loss |
|---|---|---|---|---|
| 1 | 0 | 3000 | 0 | 16.86% |
| 2 | 60 | 2800 | 0 | 1.45% |
| 3 | 90 | 2700 | 0 | 1.04% |
| 4 | 150 | 2500 | 0 | 0.55% |
| 5 | 225 | 2250 | 0 | 0.48% |
| 6 | 300 | 2000 | 0 | 0.33% |
| 7 | 300 | 0 | 2000 | 0.31% |
| 8 | 300 | 1000 | 1000 | 0.19% |
| 9 | 150 | 1250 | 1250 | 0.27% |
| 10 | 150 | 1250 | 0 | 0.58% |
| 11 | 150 | 0 | 1250 | 1.41% |

Example 22: Intensifier and Inhibitory Efficacy of CuI Nanoparticles in 28% HCl

These experiments were performed using 28% HCl instead of 15% HCl and tested for corrosion inhibition in boiling HCl for 6 hours as described in Example 19. The results demonstrate that the F1 formulation (as corrosion inhibition intensifier) in combination with trans-cinnamaldehyde as effective. F4 formulation which uses F1 along with PVP and NaI is also effective in 28% HCl.

TABLE 28

Corrosion of SS 304 balls at 100 C. for 6 hours in 28% HCl

| Sample | ppm Cu, source of CuI | ppm propargyl alcohol | ppm, trans-cinnamaldehyde | % Loss |
|---|---|---|---|---|
| 1 | 300 Cu as F1 | 2000 | 0 | 10.64% |
| 2 | 300 Cu as F1 | 0 | 2000 | 1.26% |
| 3 | 300 Cu as F1 | 1000 | 1000 | 2.98% |
| 4 | 300 Cu as F4 | 0 | 0 | 2.97% |

Example 23: Formulation with Two Corrosion Inhibitors and an Alkali Salt

Formulations were prepared using polyvinylpyrrolidone as a corrosion inhibitor along with another corrosion inhibitor in combination with an iodide salt. These formulations were tested for corrosion inhibition in boiling HCl for 6 hours as described in Example 19. The results demonstrate that the combination of PVP with TCA (trans-cinnamaldehyde) and NaI provides improved corrosion protection.

TABLE 29

Corrosion of SS 304 balls at 100 C. for 6 hours in 15% HCl

| Sample | ppm NaI | ppm PVP | ppm TCA | % Loss |
|---|---|---|---|---|
| 1 | 2000 | 0 | 8000 | 0.32% |
| 2 | 2000 | 0 | 1000 | 0.74% |
| 3 | 2000 | 3000 | 1000 | 0.07% |

Example 24: Efficacy of CuI and NaI as Corrosion Inhibitor Intensifiers

NaI or CuI as F1 was combined with various corrosion inhibitors in 15% HCl and tested for corrosion inhibition as in Example 19. NaI and the F1 formulation were both tested at equivalent iodide concentration. The results demonstrate that the F1 formulation has superior efficacy as compared to NaI Samples 1-3 demonstrate that the F1 formulation has superior inhibitory affects in the absence of a traditional corrosion inhibitor as compared to NaI Samples 4-15 demonstrate that the F1 formulation has superior inhibitory affects when combined with a traditional corrosion inhibitor as compared to NaI.

TABLE 30

Corrosion of SS 304 balls at 100 C. for 6 hours in 15% HCl

| Sample | ppm F1 | ppm NaI | ppm PA | ppm TCA | ppm DDPC | ppm BAC | % Loss |
|---|---|---|---|---|---|---|---|
| 1 | 1000 | 0 | 0 | 0 | 0 | 0 | 1.06% |
| 2 | 0 | 720 | 0 | 0 | 0 | 0 | 11.56% |
| 3 | 0 | 0 | 0 | 0 | 0 | 0 | 49.39% |
| 4 | 1000 | 0 | 2000 | 0 | 0 | 0 | 0.13% |
| 5 | 0 | 720 | 2000 | 0 | 0 | 0 | 0.65% |
| 6 | 0 | 0 | 2000 | 0 | 0 | 0 | 31.97% |
| 7 | 1000 | 0 | 0 | 2000 | 0 | 0 | 0.19% |
| 8 | 0 | 720 | 0 | 2000 | 0 | 0 | 0.41% |
| 9 | 0 | 0 | 0 | 2000 | 0 | 0 | 45.85% |
| 10 | 1000 | 0 | 0 | 0 | 2000 | 0 | 0.39% |
| 11 | 0 | 720 | 0 | 0 | 2000 | 0 | 2.31% |
| 12 | 0 | 0 | 0 | 0 | 2000 | 0 | 19.60% |
| 13 | 1000 | 0 | 0 | 0 | 0 | 2000 | 0.36% |
| 14 | 0 | 720 | 0 | 0 | 0 | 2000 | 1.16% |
| 15 | 0 | 0 | 0 | 0 | 0 | 2000 | 58.47% |

Example 25: Comparison of F1 with Mixtures of NaI and $CuCl_2$ and Mixtures of F1, NaI, and $CuCl_2$ $CuCl_2$, NaI, and CuI (as F1) were combined with a corrosion inhibitor blend consisting of PA and DDPC in 15% HCl and tested for corrosion inhibition as in Example 19, on 1018 low carbon steel balls (diameter 5/16 inch or 0.79 cm). $CuCl_2$, NaI, and F1 were tested separately and as mixtures. The results demonstrate that the F1 formulation has superior inhibition intensifier efficacy as compared to both NaI and $CuCl_2$ and mixtures of NaI and $CuCl_2$ for low carbon steel.

TABLE 31

Corrosion of 1018 low carbon steel balls at 100 C. for 6 hours in 15% HCl

| Sample | ppm F1 | ppm NaI | ppm $CuCl_2$ | ppm DDPC | ppm PA | % Loss |
|---|---|---|---|---|---|---|
| 1 | 1000 | 0 | 0 | 1000 | 1000 | 0.98% |
| 2 | 667 | 333 | 0 | 1000 | 1000 | 9.57% |
| 3 | 667 | 0 | 333 | 1000 | 1000 | 7.29% |
| 4 | 333 | 667 | 0 | 1000 | 1000 | 6.19% |
| 5 | 333 | 333 | 333 | 1000 | 1000 | 3.00% |
| 6 | 333 | 0 | 667 | 1000 | 1000 | 6.74% |
| 7 | 0 | 1000 | 0 | 1000 | 1000 | 57.25% |
| 8 | 0 | 667 | 333 | 1000 | 1000 | 11.35% |
| 9 | 0 | 333 | 667 | 1000 | 1000 | 12.57% |
| 10 | 0 | 0 | 1000 | 1000 | 1000 | 5.64% |

Example 26: Efficacy of F1 Compared to NaI or CuCl (all at 1000 PPM) as Corrosion Intensifiers for Four Different Steels when Added to Corrosion Inhibitors DDPC AND PA $CuCl_2$, NaI, or CuI as F1 was combined with a corrosion inhibitor blend consisting of TCA and DDPC in 15% HCl and tested for corrosion inhibition as in Example 19, however, different metals were also compared. $CuCl_2$, NaI, and F1 were all tested at equivalent ppm of total material, thus NaI has more iodide than F1 and $CuCl_2$ has more copper than F1. The results demonstrate that the F1 formulation has superior efficacy as compared to both NaI and $CuCl_2$ for all four metal chemistries tested. Collectively, these results demonstrate that the F1 formulation has superior inhibitory effects as intensifiers across a wide variety of metals. Unless specifically mentioned, in all experiments when balls were used for testing, the size of 1018 and S2 steel were similar (5/16 inch or 0.79 cm) and the diameter of stainless steel 304 and steel E52100 balls used in the evaluation was similar (9/32 inch or 0.71 cm).

TABLE 32

Corrosion of various steel balls at 100 C. for 6 hours in 15% HCl

| Sample | ppm F1 | ppm NaI | ppm $CuCl_2$ | ppm DDPC | ppm PA | Metal | % Loss (n = 2) |
|---|---|---|---|---|---|---|---|
| 1 | 1000 | 0 | 0 | 1000 | 1000 | 1018 | 0.32% |
| 2 | 0 | 1000 | 0 | 1000 | 1000 | | 6.88% |
| 3 | 0 | 0 | 1000 | 1000 | 1000 | | 0.82% |
| 4 | 0 | 0 | 0 | 1000 | 1000 | | 14.64% |
| 5 | 0 | 0 | 0 | 0 | 0 | | 58.55% |
| 6 | 1000 | 0 | 0 | 1000 | 1000 | 304 | 0.08% |
| 7 | 0 | 1000 | 0 | 1000 | 1000 | | 0.10% |
| 8 | 0 | 0 | 1000 | 1000 | 1000 | | 0.48% |
| 9 | 0 | 0 | 0 | 1000 | 1000 | | 0.60% |
| 10 | 0 | 0 | 0 | 0 | 0 | | 29.36% |
| 11 | 1000 | 0 | 0 | 1000 | 1000 | S2 | 1.00% |
| 12 | 0 | 1000 | 0 | 1000 | 1000 | | 4.00% |
| 13 | 0 | 0 | 1000 | 1000 | 1000 | | 2.64% |
| 14 | 0 | 0 | 0 | 1000 | 1000 | | 12.60% |
| 15 | 0 | 0 | 0 | 0 | 0 | | 55.47% |
| 16 | 1000 | 0 | 0 | 1000 | 1000 | E52100 | 0.19% |
| 17 | 0 | 1000 | 0 | 1000 | 1000 | | 1.45% |
| 18 | 0 | 0 | 1000 | 1000 | 1000 | | 0.80% |
| 19 | 0 | 0 | 0 | 1000 | 1000 | | 3.29% |
| 20 | 0 | 0 | 0 | 0 | 0 | | 79.01% |

Example 27: Efficacy of F1 as Compared to NaI and Also to CuCl (Mixed at Equivalent Cu and I) for Four Different Steels when Added to Inhibitors Comprising DDPC and TCA $CuCl_2$, NaI, or CuI as F1 was combined with a corrosion inhibitor blend consisting of TCA and DDPC in 15% HCl and tested for corrosion inhibition as in Example 19, however, different metals were also compared. $CuCl_2$, NaI, and F1 were all tested at equivalent ppm of copper and iodide. The results demonstrate that the F1 (CuI) formulation has superior efficacy as compared to when NaI and $CuCl_2$ are added at equivalent copper and iodide concentrations. The results also demonstrate that formulation F1 has superior pitting resistance.

TABLE 33

Corrosion of 1018 low carbon steel balls at 100 C. for 6 hours in 15% HCl

| | ppm F1 | ppm NaI | ppm CuCl2 | ppm DDPC | ppm TCA | Metal | % Loss | Pitting |
|---|---|---|---|---|---|---|---|---|
| 1 | 1000 | 0 | 0 | 1000 | 1000 | 1018 | 0.18% | No |
| 2 | 0 | 720 | 338 | 1000 | 1000 | 1018 | 0.58% | Yes |
| 3 | 500 | 0 | 0 | 1000 | 1000 | 1018 | 0.63% | No |
| 4 | 0 | 360 | 169 | 1000 | 1000 | 1018 | 0.81% | Yes |
| 5 | 1000 | 0 | 0 | 1000 | 1000 | 304 | 0.07% | No |
| 6 | 0 | 720 | 338 | 1000 | 1000 | 304 | 0.09% | No |
| 7 | 500 | 0 | 0 | 1000 | 1000 | 304 | 0.16% | No |
| 8 | 0 | 360 | 169 | 1000 | 1000 | 304 | 0.15% | No |
| 9 | 1000 | 0 | 0 | 1000 | 1000 | S2 | 2.03% | Yes |
| 10 | 0 | 720 | 338 | 1000 | 1000 | S2 | 1.51% | Yes |
| 11 | 500 | 0 | 0 | 1000 | 1000 | S2 | 2.10% | Yes |
| 12 | 0 | 360 | 169 | 1000 | 1000 | S2 | 1.00% | Yes |
| 13 | 1000 | 0 | 0 | 1000 | 1000 | E52100 | 0.23% | No |
| 14 | 0 | 720 | 338 | 1000 | 1000 | E52100 | 0.23% | No |
| 15 | 500 | 0 | 0 | 1000 | 1000 | E52100 | 0.34% | No |
| 16 | 0 | 360 | 169 | 1000 | 1000 | E52100 | 0.37% | No |

Example 28: Compatibility of F1 Formulation in Presence of Common Acidizing Additives F1 was combined with DDPC and TCA as in Example 26 and tested against 1018 low carbon steel as in Example 25. Separately each of a variety of common acidizing additives were tested along with F1 to see if any adverse reaction (such as precipitation) or reduction of corrosion inhibition is observed. The materials were citric acid, acetic acid and sodium ascorbate (used as iron control agents), polyacrylamide and polyacrylate (used as scale inhibitors), Sodium lauryl sulfate (SLS), isopropyl alcohol (IPA) and ethylene glycol (used for emulsion prevention of oil and acids) and calcium chloride (added to prevent anhydrite precipitation). These were tested by separately adding these to F1 and then testing the efficacy of the mixture on 1018 steel in 15% HCl for 6 hours at 100 C. The additives were 12,000 ppm citric acid, 12,000 ppm acetic acid, 12,000 ppm sodium ascorbate, 10 wt % $CaCl_2$, 1000 ppm polyacrylamide (MW=10,000), 1000 ppm polyacrylate (MW=1800), 2000 ppm SLS, 2000 ppm isopropylalcohol, 2000 ppm ethylene glycol, and 2000 ppm pentanol. None of these affected the corrosion inhibition efficacy of the F1 formulation.

Example 29: Efficacy of Tungsten Chloride and Manganese Chloride as Corrosion Inhibitor Intensifiers $WCl_6$, $MnCl_2$, or NaI were combined as corrosion intensifier inhibitors with DDPC and TCA and tested against 1018 low carbon steel as in Example 25. The results demonstrate that $WCl_6$ and $MnCl_2$ also work as effective corrosion inhibitor intensifiers. One may also combine several of these intensifiers in the same formulation.

TABLE 34

Corrosion of 1018 low carbon steel balls at 100 C. for 6 hours in 15% HCl

| Sample | ppm TCA | ppm PA | ppm DDPC | ppm NaI | ppm WCl6 | ppm MnCl2 | % Loss |
|---|---|---|---|---|---|---|---|
| 1 | 1000 | | 1000 | | | | 25.72% |
| 2 | 1000 | | 1000 | 1000 | | | 5.80% |
| 3 | 1000 | | 1000 | | 1000 | | 2.53% |
| 4 | 1000 | 1000 | 1000 | | | | 17.07% |
| 5 | 1000 | 1000 | 1000 | | | 1000 | 0.98 |

Example 30: Corrosion Inhibition Formulation with Derivative of Propargyl Alcohol and Water Soluble Salt of Copper Samples of various steels were tested as in Example 19 at 200 f (~93 C) for 24 hours in 15% HCl. The formulations had either propargyl alcohol (PA), or a derivative of propargyl alcohol PM. PM is Korantin® PM (available from BASF, Germany) and is a propargyl alcohol alkoxylate.

TABLE 35

Corrosion of various steel balls at 200 F. for 24 hours in 15% HCl

| Sample | CuCl2, ppm | PM, ppm | PA, ppm | TCA, ppm | DDPC, ppm | % Loss Low C. Steel 1018 | % Loss St. Steel 304 |
|---|---|---|---|---|---|---|---|
| 1 | 500 | | | 2000 | 250 | 2.92% | 7.26% |
| 2 | 500 | | | 1500 | 250 | 3.28% | 12.99% |
| 3 | 500 | | | 1000 | 250 | 3.39% | 20.61% |
| 4 | 500 | | 1000 | 1000 | 250 | 1.78% | 6.78% |
| 6 | 500 | 500 | | 1000 | 250 | 2.20% | 26.87% |
| 7 | 500 | | 2000 | | 250 | 3.95% | 30.07% |
| 9 | 500 | 1000 | | | 250 | 4.86% | 85.10% |
| 10 | 500 | | 2000 | | 250 | 1.42% | 41.95% |

The results show that superior results were obtained when all three TCA, DDPC and propargyl alcohol (or a derivative of propargyl alcohol) was present. For example result 4 is superior to result 1, where the total amount of corrosion inhibitor is the same, but the latter has all the three ingredients. Similarly sample 6 with all of the three inhibitors present is superior to sample 2 (both have similar concentration of corrosion inhibitors). Another experiment was done by varying the composition as shown in Table 36. The results show that in the formulations containing all three inhibitors, TCA helps to reduce pitting on the surface as the surfaces after the test were shiny with no appearance of pits (e.g., compare sample 13 with 10). As seen in these results, one can lower the concentration of TCA and the cationic surfactant and still get highly favorable results (compare samples 1, 4, 7 and 10). Further the preferred corrosion inhibition formulation (e.g., sample 10) had a higher concentration of propargyl alcohol (or a polymerizable material) as compared to the aldehyde and the cationic surfactant

TABLE 36

Corrosion of low carbon steel balls (type 1018) at 200 F. for 24 hours in 15% HCl

| Sample | CuCl2, ppm | PA, ppm | TCA, ppm | DDPC, ppm | Average Loss (n = 3) | Surface appearance |
|---|---|---|---|---|---|---|
| 1  | 500 | 1000 | 1000 | 250 | 2.24% | SHINY |
| 4  | 500 | 2000 | 800  | 250 | 1.44% | SHINY |
| 7  | 500 | 2000 | 500  | 250 | 1.68% | SHINY |
| 10 | 500 | 2000 | 250  | 250 | 1.60% | SHINY |
| 13 | 500 | 2000 |      | 250 | 1.82% | NOT SHINY |

Table 37 shows that in a formulation containing PA, TCA and the DDPC, if one were to remove DDPC, the loss in weight (or corrosion) increased dramatically, thus the combination of a polymerizable material, an aldehyde and a cationic surfactant is a highly synergistic corrosion inhibition formulation. In addition, when corrosion is measured at 200 F, it shows that copper is not playing an important role and can be eliminated from the formulation for low carbon steels (compare samples in Tables 37 and 38).

TABLE 37

Corrosion of low carbon steel (type 1018) balls at 200 F. for 24 hours in 15% HCl

| Sample | CuCl2, ppm | PA, ppm | TCA, ppm | DDPC, ppm | % Loss |
|---|---|---|---|---|---|
| 1 | 500 | 2000 | 250 | 250 | 1.54% |
| 6 | 500 | 2000 | 250 | 125 | 0.49% |
| 7 | 500 | 2000 | 250 | 0   | 32.98% |

TABLE 37

Corrosion of low carbon steel (type 1018) balls at 200 F. for 24 hours in 15% HCl

| Sample | CuCl2 | PA | TCA | DDPC | % Loss | Surface appearance |
|---|---|---|---|---|---|---|
| 15 | 0 | 2000 | 250 | 125 | 0.55% | SHINY |

In another experiment, steel balls (steel type 1018) were used and subject to corrosion in different volumes of acid (15% HCl) at 200 F for 24 hours. The flask shape and volume was same for all of these experiments. As shown in Table 38, when there was no inhibitor in the acid, the weight loss increased with increasing acid volume, since a considerable amount of acid gets consumed in reacting with the metal, and as the acid gets used up its concentration drops decreasing its reactivity. When small amounts of acid are used, then the weight loss slows down or gets arrested as the acid concentration drops. The same experiment was carried out using 10 ml and 20 ml of the acid with PA, TCA and DDPC concentrations of 2000, 250 and 125 ppm respectively, as seen in Table 38, 10 ml of inhibited acid is sufficient to provide reliable results since very little acid is consumed, and there is only a little change in acid concentration over the experimentation period.

TABLE 38

Effect of acid volume on corrosion results

| Acid (mL) | Acid inhibited? | Wt Loss | Notes |
|---|---|---|---|
| 2.5 | No  | 17%  | sample not fully submerged |
| 5   | No  | 34%  | |
| 10  | No  | 60%  | |
| 20  | No  | 100% | |
| 10  | Yes | 1%   | |
| 20  | Yes | 1%   | |

Example 31: Corrosion Inhibition on Various Steels Used in Oil Field

In this experiment, several steels certified by American petroleum institute (API) were evaluated in 15% HCl. These steels were QT1000 (Obtained from Quality Tubing, Houston, Tex.); and N80 and Cr13 (obtained from CPCO Inc, Claremore, Okla.). For QT1000, coupons were cut from a flat steel stock in a thickness of 3/16 inch (0.48 cm) and a size of 1 cm by 1 cm. For others samples were cut from a pipe in a size of 1 cm×1 cm. the thickness of Cr13 coupons was 3/16 inch and for N80 it was 1/8 inch (0.32 cm). For 1018 steel and stainless steel 304, solid balls were used in a size as discussed earlier. The acid volume was 10 ml. Each sample was put in a separate round bottom flask and a number of these were then placed in a thermally controlled liquid bath and each flask fitted with a condenser system to avoid any loss of acid from the flasks. The weight loss results are shown in the Table 39. The corrosion inhibitor containing all three components, i.e., polymerizable monomer (propargyl alcohol (PA), transcinnamonaldehyde (TCA) and dodecyl pyridinium chloride (DDPC) performed the best on all steels showing the lowest weight loss. Results are also shown when the monomeric component (PA) was not used corrosion (weight loss) went up, and the amount of corrosion was higher by more than a factor of 100 when none of the inhibitor components were added to the acid. These results also show that use of 1018 or 304 stainless steels were good substitutes in previous experiments to determine the compositions for corrosion inhibitors.

TABLE 39

Corrosion of various API steels and other steels 200 F. for 24 hours in 15% HCl with corrosion inhibitor.

| Sample | PA | TCA | DDPC | Steel | % Loss |
|---|---|---|---|---|---|
| 1  | 2000 | 250  | 125  | 1018 Ball   | 0.51% |
| 2  | 2000 | 250  | 125  | 1018 Ball   | 0.46% |
| 3  | 2000 | 250  | 125  | QT1000      | 0.31% |
| 4  | 2000 | 250  | 125  | QT1000      | 0.26% |
| 5  | 2000 | 250  | 125  | 304 Ball    | 0.09% |
| 6  | 2000 | 250  | 125  | 304 Ball    | 0.10% |
| 7  | 2000 | 250  | 125  | CR13        | 0.46% |
| 8  | 2000 | 250  | 125  | CR13        | 0.47% |
| 9  | 2000 | 250  | 125  | S2Ball      | 3.04% |
| 10 | 2000 | 250  | 125  | S2Ball      | 2.55% |
| 11 | 2000 | 250  | 125  | E52100 Ball | 0.51% |
| 12 | 2000 | 250  | 125  | E52100 Ball | 0.43% |
| 13 | 2000 | 250  | 125  | N80         | 0.31% |
| 14 | 2000 | 250  | 125  | N80         | 0.32% |
| 15 |      | 2000 | 2000 | QT1000      | 1.19% |
| 16 |      |      |      | QT1000      | 34.86% |

TABLE 39-continued

Corrosion of various API steels and other steels 200 F. for 24 hours in 15% HCl with corrosion inhibitor.

| Sample | PA | TCA | DDPC | Steel | % Loss |
|---|---|---|---|---|---|
| 17 | 2000 | 2000 | | CR13 | 1.08% |
| 18 | | | | CR13 | 39.27% |
| 19 | 2000 | 2000 | | N80 | 1.41% |
| 20 | | | | N80 | 43.18% |

Additional experiments were conducted on the API steels at 150° F. (66° C.) and 200° F. (93° C.). The concentrations of the three inhibitor components in 15% HCL was the same as in the above table (Table 38) for experiments at 200 F and was cut down to half for experiments at 150 F. The time period for both experiments was 24 hours.

Further experiments were done to test the formulation 2000:250:125 (PA:TCA:DDPC by weight). 2GPT addition was used at 150 F and 4GPT at 200 F. 2GPT works very well at 150° F. but at 200° F. a conc of 4GPT was used. This suggests that at higher temperatures higher concentrations of corrosion inhibitor will have to be used. API steels as approximately 1 cm×1 cm squares with a measured thickness of 3/16 inch for the QT and CR13 or 2/16 for the N80 were used; and for non API steels, spheres were used: All of these experiments were conducted in duplicates using 15% HCL. At 4GPT, the concentration of PA:TCA:DDPC is 2000:250:125 ppm in the acid.

TABLE 40

Corrosion inhibition effect of CI concentration and temperature on various API steels in 15% HCl

| Steel | Temp, F. | Time, hrs | Conc of CI, GPT* | Weight loss (lb/ft$^2$) |
|---|---|---|---|---|
| 1018 | 200 | 24 | 4 | 0.0310 |
| 304 | 200 | 24 | 4 | 0.0054 |
| QT | 200 | 24 | 4 | 0.0056 |
| CR13 | 200 | 24 | 4 | 0.0079 |
| N80 | 200 | 24 | 4 | 0.0059 |
| QT | 150 | 24 | 2 | 0.0058 |
| CR13 | 150 | 24 | 2 | 0.0052 |
| N80 | 150 | 24 | 2 | 0.0057 |
| QT | 150 | 24 | 4 | 0.0054 |
| CR13 | 150 | 24 | 4 | 0.0048 |
| N80 | 150 | 24 | 4 | 0.0048 |

Additionally the results for the volume-concentration testing are below at 200 F for 24 hrs.

TABLE 41

Effect of acid amount on corrosion of 1018 steel balls in 15% HCl

| Acid (mL) | Actives (mole) | Actives (ppm) | Wt Loss | Notes |
|---|---|---|---|---|
| 2.5 | 0 | 0 | 17% | sample not fully submerged |
| 5 | 0 | 0 | 34% | |
| 10 | 0 | 0 | 60% | |
| 20 | 0 | 0 | 100% | |
| 2.5 | 0.00008 | 2375 | 16% | 4gpt, sample not fully submerged |
| 5 | 0.00016 | 2375 | 10% | 4gpt |
| 10 | 0.00031 | 2375 | 1% | 4gpt |
| 20 | 0.00062 | 2375 | 1% | 4gpt |
| 10 | 0.00016 | 1187.5 | 63% | 2gpt |
| 20 | 0.00031 | 1187.5 | 100% | 2gpt |

With no corrosion inhibitor, weight loss increases with increasing acid volume, as more of the steel gets consumed.

Example 32: Evaluation of the Additional Corrosion Inhibitors

In this experiment in addition to the propargyl alcohol (PA) cinnamonaldehyde (TCA) and DDPC, other nitrogen containing corrosion inhibitors were also evaluated. These were quinolone (QO), quinaladine (QA), and nicotinic acid (NA). Although quinolone and quinaladine are well known in the art and did perform well with respect to weight loss of the samples, they imparted blemishes and burrs on to the surface of the metal. samples with nicotinic acid or propargyl containing samples along with DDPC and TCA performed markedly similar in maintaining a superior surface finish.

TABLE 42

Comparison of various corrosion inhibitor formulations in 15% HCl on 1018 steel at 200 F. for 24 hrs.

| Sample | QA | QAA | NA | PA | TCA | DDPC | % Loss | Notes |
|---|---|---|---|---|---|---|---|---|
| 1 | | | | | | | 59.16% | Corroded |
| 2 | | | | 2000 | 250 | 125 | 1.12% | Pristine Surface |
| 3 | 2000 | | | | 250 | 125 | 0.93% | Blemished |
| 4 | | 2000 | | | 250 | 125 | 1.24% | Blemished |
| 5 | | | 2000 | | 250 | 125 | 0.89% | Pristine Surface |
| 6 | | | | 2000 | 250 | | 23.6% | Corroded |
| 7 | 2000 | | | | 250 | | 49.3% | Corroded |
| 8 | | 2000 | | | 250 | | 48.5% | Corroded |
| 9 | | | 2000 | | 250 | | 57.4% | Corroded |

Example 33: Iron Reduction

Various formulations were tested for their ability to reduce ferric ions to ferrous ions. Various aqueous solutions was first prepared as described Table-43 for each sample, and labeled as "Solution 1", where various "Solution 1" formulations are then added to the 15% HCl containing ferric ions as shown in Table 44.

TABLE 43

Solution 1

| Example | PA1 | 1 | 2 | 3 | 4 | 5 | 6 | 7 | 8 | 9 | 10 | 11 |
|---|---|---|---|---|---|---|---|---|---|---|---|---|
| Water, ml | 100 | 100 | 100 | 100 | 100 | 100 | 100 | 100 | 100 | 100 | 100 | 100 |
| Sodium sulfite, g | 20 | 20 | | | | | | | | 20 | | |
| Potassium iodide, g | 2.7 | | | | | | | | | | | |
| $NH_4^+$ Thioglycolate, g | 2.8 | 2.8 | | | | | | | | 2.8 | | |
| Cuprous Iodide (F1), g | | 3.4 | 3.4 | | 3.4 | 3.4 | | | 3.4 | 3.4 | 3.4 | 3.4 |
| Cuprous Chloride, g | | | | | | | 1.6 | | | | | |
| Ascorbic Acid, g | | | | 4.7 | 4.7 | | 4.7 | | | | 4.7 | |
| Sodium Ascorbate, g | | | | | | 5.3 | | | | | | |
| Sodium Thiosulfate, g | | | | | | | | 4.3 | 4.3 | | | 4.3 |

An aliquot of this "Solution 1" from Table 43 was combined with a ferric ion containing acid as described in Table-44. After two minutes, this final mixture was examined for visual color change. The ferric ion solution is initially strongly colored and upon reduction becomes colorless.

copper salts. The copper content of all of these solutions was the same, e.g., in the solution with CuI, 3.4 g of CuI as F1 was used. Then 1.5 ml of these solutions were taken (as in Example 33 and mixed with ferric ion solution. The ferric ion solution was 100 ml of HCl and 0.4 g of $FeCl_3$. After the two solutions were mixed, the copper concentration in these

TABLE 44

Final Mixture

| Example | PA1 | 1 | 2 | 3 | 4 | 5 | 6 | 7 | 8 | 9 | 10 | 11 |
|---|---|---|---|---|---|---|---|---|---|---|---|---|
| Solution 1(from Table 43), ml | 1.5 | 1.5 | 1.5 | 1.5 | 1.5 | 1.5 | 1.5 | 1.5 | 1.5 | 1.5 | 1.5 | 1.5 |
| $FeCl_3$, g | 0.4 | 0.4 | 0.4 | 0.4 | 0.4 | 0.4 | 0.4 | 0.4 | 0.4 | 0.4 | 0.4 | 0.4 |
| HCl 15%, ml | 100 | 100 | 100 | 100 | 100 | 100 | 100 | 100 | 100 | | | |
| Corrosion Inhibited Acid* | | | | | | | | | | 100 | 100 | 100 |
| $CuCl_2·2 H_2O$, g | 0.04 | | | | | | | | | | | |
| Ferric ion reduction in two minutes | Yes | Yes | No | No | Yes | Yes | Yes | No | Yes | Yes | Yes | Yes |

*In addition to 15% HCL these have 2,000 ppm of PA, 250 ppm of TCA and 125 ppm of DDPC (see sample 2 in Table 42)

As shown in the above tables, functionalized cuprous iodide particles as described in Example 1 (F1) were combined with several iron reducing formulations. It was found in all formulations the prepared CuI particles were effective in reducing iron (samples 1, 2, 3, 5). The advantage of F1 is its superior dispersability in a CI formulation which can be added to the acids in the field. These effective formulations were further combined with acid along with corrosion inhibitors (samples 9, 10, 11). The corrosion inhibitor containing formulations were equally effective in demonstrating a complete reduction of ferric ions in less than 2 minutes. The corrosion inhibition of the formulations containing both the corrosion inhibitors and the ferric ion reducing materials is discussed in Example 35 however, their ferric ion reduction properties are confirmed by seeing the results on samples 9, 10 and 11. Specifically, Sample 10 can be compared with Sample 2 of table 45; and sample 11 of the above table can be compared with sample 11 of Table 45, showing that these formulations provide both ferric ion reduction and good corrosion protection.

Example 34: Ferric Ion Reduction with Different Copper Salts

In order to demonstrate the superiority of cuprous compounds for iron reduction, several copper containing formulations were made. These formulations comprised ascorbic acid and one of: cuprous iodide, cuprous chloride, or cupric chloride. All of these formulations were prepared using 100 ml of water with 2.35 g of ascorbic acid along with the copper salts. The copper content of all of these solutions was 154 ppm and ascorbic acid was 353 ppm. These formulations were prepared with lower amount of ascorbic acid in order to better resolve differences in the kinetics of ferric ion reduction.

Maximum absorbance of the ferric chloride containing acid was recorded at 375 nm, and this wavelength was used to measure reduction of Fe(III) to Fe(II) over a ten minute time period. The results of this, shown in FIG. 2, demonstrate that cuprous materials are more effective than cupric salts and furthermore cuprous iodide is far better than the cuprous chloride.

Example 35: Testing of Corrosion Inhibition of Formulations Comprising Corrosion Inhibitors and Iron Reducing Components In order to determine whether the addition of ferric iron reducing additives had an effect on acid corrosion three of the ferric ion reduction formulations were added to 15% HCl acid which contained corrosion inhibitors. In the acid, the corrosion inhibitors were present at 2000 ppm PA, 250 ppm TCA, and 125 ppm DDPC. The numbers below the various ingredients in Table 45 are concentrations in ppm by weight in the acid composition. The effect of these additions is shown in Table-45 on corrosion inhibition expressed as weight loss when treated in the inhibited acid at 200° F. for 24 hours.

Samples 1 and 7 do not provide ferric ion reduction ability, while compositions 2, 3, 8, 9, 11 and 12 provide corrosion protection as well as ferric ion reduction. Sample 9 is similar to the sample PA1 in Example 33 in terms of ferric ion reduction but it has been added to the corrosion inhibitor of Embodiment 3. Sample 7 shows that the addition of these sulfur compounds degrades the performance of the corrosion inhibitor when other additives such as CuI or copper and iodide sources are not used as compared to the use of ascorbic acid in sample 1.

TABLE 45

Corrosion of low carbon steel (type 1018) balls at 200 F. for 24 hours in inhibited 15% HCl

| Sample | CuCl$_2$ | KI | CuI (F1) | Ascorbic Acid | Sodium Sulfite | Ammonium Thioglycolate | Sodium Thiosulfate | % wt Loss |
|---|---|---|---|---|---|---|---|---|
| 1 | | | | 705 | | | | 0.95% |
| 2 | | | 512 | 705 | | | | 1.40% |
| 3 | 315 | 405 | | 705 | | | | 0.92% |
| 7 | | | | | 3000 | 420 | | 16.67% |
| 8 | | | 512 | | 3000 | 420 | | 3.55% |
| 9 | 315 | 405 | | | 3000 | 420 | | 2.78% |
| 10 | | | | | | | 645 | 2.40% |
| 11 | | | 512 | | | | 645 | 1.90% |
| 12 | 315 | 405 | | | | | 645 | 1.23% |

It will be understood that various modifications may be made to the embodiments disclosed herein. Hence the above description should not be construed as limiting, but merely as exemplifications of preferred embodiments. Those skilled in the art will envision other modifications that come within the scope and spirit of the claims appended hereto. All patent applications cited as priority (related applications) are explicitly incorporated herein by reference in their entirety.

The invention claimed is:

1. A method for providing an acid solution that contacts a metal with at least one of (i) reduction in corrosion of said metal by said acid solution and (ii) reduction in the formation of ferric ions in said solution, comprising adding to the said acid solution at least three materials selected from the following categories, wherein at least one material is selected from each of these categories:
   (a) cationic surfactant;
   (b) phenylpropanoid and;
   (c) a material selected from at least one of a monomeric material and a nitrogen containing material;
   wherein the total amount by weight of materials (b) and (c) exceeds the amount by weight of material (a) by a factor of about 8 or more.

2. The method of claim 1, wherein the said monomeric material comprises an acetylenic or a vinyl compound; the phenylpropanoid comprises cinnamonaldehyde; the nitrogen containing material is selected from quinolines, nicotinic acid, and PVP containing polymer; and the cationic surfactant comprises a salt comprising a cation selected from ammonium, phosphonium, imidazolium, pyridinium, pyrrolidinium, pyridazinium, pyrimidinium, pyrazinium, imidazolium, pyrazolium, and triazolium, and anions containing halides.

3. The method of claim 2, wherein the acetylenic compound is selected from propargyl alcohol and its derivatives, the cinnamonaldehyde comprises trans-cinnamonaldehyde, and the cationic salt has at least one alkyl chain with an average length of C12 to C15.

4. The method of claim 2, further containing a corrosion inhibition intensifier which comprises at least one of a compound of V, Co, Mo, Ta, Sn, Bi, Mn, W, Cu and I.

5. The method of claim 4, wherein the corrosion inhibition intensifier comprises at least one of CuI, LiI, KI and NaI.

6. The method of claim 1, wherein said method further comprises adding CuI as pre-formed particles in a size less than about 1,000 nm to said acid solution.

7. The method of claim 6, wherein the particles of CuI are surface modified.

8. The method of claim 1, further comprising adding surface modified particles of a low water solubility material wherein the surfaces of said particles are modified by a surface functionalization agent with a molecular weight of at least 60.

9. The method of claim 1 further comprising adding at least one reducing agent.

10. A method for providing, when a ferrous metal is contacted by an acid solution, at least one of
    (i) reduction in corrosion of said ferrous metal by the acid solution and
    (ii) reduction in the formation of ferric ions in said solution,
    which comprises adding to the said acid solution at least three materials selected from the following categories, wherein at least one material is selected from each of these categories:
    (a) cationic surfactant;
    (b) phenylpropanoid and;
    (c) a material selected from at least one of a monomeric material and a nitrogen containing material;
    wherein the total amount by weight of materials (b) and (c) exceeds the amount by weight of material (a) by a factor of about 8 or more.

11. The method of claim 10, wherein said method further comprises adding CuI as pre-formed particles in a size less than about 1,000 nm to said acid solution and wherein the pre-formed particles of CuI are surface modified by a functionalizing agent with a molecular weight of at least 60.

12. The method of claim 10, further comprising adding at least one reducing agent.

13. A method for providing, when a ferrous metal is contacted by an acid solution, at least one of
    (i) reduction in corrosion of said metal by an acid solution and
    (ii) reduction in the formation of ferric ions in said solution,
    which comprises adding to the said acid solution at least four materials selected from the following categories, wherein at least one material is selected from each of these categories:
    (a) cationic surfactant;
    (b) phenylpropanoid;

(c) a material selected from at least one of a monomeric material and a nitrogen containing material; and (d) a reducing agent;

wherein the total amount by weight of materials (b) and (c) exceeds the amount by weight of material (a) by a factor of about 8 or more.

14. The method of claim 13, wherein said method further comprises adding CuI as pre-formed particles in a size less than about 1,000 nm to said acid solution and wherein the pre-formed particles of CuI are surface modified by a functionalizing agent with a molecular weight of at least 60.

* * * * *